US012674513B2

(12) United States Patent
Park et al.

(10) Patent No.: US 12,674,513 B2
(45) Date of Patent: Jul. 7, 2026

(54) OPENING/CLOSING VALVE

(71) Applicants: Hyundai Motor Company, Seoul
(KR); Kia Corporation, Seoul (KR)

(72) Inventors: In Tae Park, Hwaseong-si (KR);
Hyeon Seok Ban, Hwaseong-si (KR);
Gyu Young Kim, Hwaseong-si (KR)

(73) Assignees: Hyundai Motor Company, Seoul
(KR); Kia Corporation, Seoul (KR)

( * ) Notice: Subject to any disclaimer, the term of this
patent is extended or adjusted under 35
U.S.C. 154(b) by 0 days.

(21) Appl. No.: 18/887,135

(22) Filed: Sep. 17, 2024

(65) Prior Publication Data

US 2025/0129851 A1    Apr. 24, 2025

(30) Foreign Application Priority Data

Oct. 23, 2023    (KR) ......................... 10-2023-0142287

(51) Int. Cl.
*F16K 1/22*    (2006.01)
*F16K 31/06*    (2006.01)
(52) U.S. Cl.
CPC .......... *F16K 1/221* (2013.01); *F16K 31/0682*
(2013.01); *F16K 31/0675* (2013.01)
(58) Field of Classification Search
CPC ............. F16K 31/0648; F16K 31/0651; F16K
31/0655; F16K 31/0658; F16K 31/0675;
F16K 31/0682; F16K 1/221
See application file for complete search history.

(56) References Cited

U.S. PATENT DOCUMENTS

| | | | | |
|---|---|---|---|---|
| 10,801,639 B2 * | 10/2020 | Andueza | .............. | F16K 31/003 |
| 11,378,195 B2 * | 7/2022 | Karino | ............... | F16K 31/0682 |

FOREIGN PATENT DOCUMENTS

| | | | | |
|---|---|---|---|---|
| CN | 108709007 A | 10/2018 | | |
| CN | 110725959 A | 1/2020 | | |
| CN | 218236177 U | 1/2023 | | |
| DE | 19918007 A1 * | 10/2000 | ......... | F16K 31/0682 |
| JP | H04370482 A | 12/1992 | | |
| JP | 2005180535 A | 7/2005 | | |
| KR | 20070078149 A | 7/2007 | | |
| KR | 20140080109 A | 6/2014 | | |
| KR | 20170035636 A | 3/2017 | | |

OTHER PUBLICATIONS

Machine English translation of DE-19918007-A1 (Year: 2025).*

* cited by examiner

*Primary Examiner* — Hailey K. Do
(74) *Attorney, Agent, or Firm* — Slater Matsil, LLP

(57)    ABSTRACT

Disclosed is an opening/closing valve including a valve
body defining a passage, through which a fluid flows in a
first direction, a solenoid coil mounted on the valve body
along the first direction to surround the passage on an
outside of the passage, and a valve disk including a magnetic
substance and that is rotated on the passage to open and
close the passage with the solenoid coil.

18 Claims, 29 Drawing Sheets

501

OPENING/CLOSING VALVE

CROSS-REFERENCE TO RELATED APPLICATION

This application claims the benefit of priority to Korean Patent Application No. 10-2023-0142287, filed in the Korean Intellectual Property Office on Oct. 23, 2023, the entire contents of which are incorporated herein by reference.

TECHNICAL FIELD

The present disclosure relates to an opening/closing valve.

BACKGROUND

An opening/closing valve may be a device for adjusting flow of a fluid by opening and closing a passage for the flow of the fluid. The opening/closing valve may be classified into a butterfly valve that adjusts flow of a fluid by installing a rotary shaft of a valve disk having a disk shape to rotate a shaft, and a solenoid valve that is opened or closed with a magnetic force while winding a conductor wire in a spiral form such that electricity flows therethrough.

The butterfly valve may be operated in an electric form, and in this case, manufacturing costs increase because it has to be provided with a motor and a reducer. Furthermore, it may be difficult to produce a solenoid valve with a passage having a relatively large diameter.

SUMMARY

Embodiments provide an opening/closing valve that may be provided with a passage of a larger diameter. Manufacturing cost of can be relatively low. In addition, advantages achieved by the prior art may be maintained intact.

An aspect of the present disclosure provides an opening/closing valve that may rotate a valve disk by using a solenoid coil.

Embodiments are not limited to solving the aforementioned problems and other modifications and advantages not mentioned herein will be clearly understood from the following description by those skilled in the art to which the present disclosure pertains.

According to an aspect of the present disclosure, an opening/closing valve may include a valve body defining a passage, through which a fluid can flow in a first direction. A solenoid coil may be mounted on the valve body along the first direction to surround the passage on an outside of the passage. A valve disk including a magnetic substance and may be rotatable within the passage to open and close the passage with the solenoid coil.

The valve disk may be rotatable about a rotary shaft extending in a second direction that is perpendicular to the first direction, the valve disk being rotatable between a closing position and an opening position, wherein the opening/closing valve may be configured so that flow of the fluid flowing through the passage may be blocked when the valve disk in the closing position and the flow of the fluid flowing through the passage may be allowed when the valve disk is in the opening position.

A first rotational direction may be defined as a direction in which the valve disk is rotated from the opening position to the closing position. An inner peripheral surface of the valve body may define the passage and the valve body may include a guide rib protruding from the inner peripheral surface of the valve body, to prevent the valve disk from being rotated from the closing position in the first rotational direction.

First and second parts of the valve disk may be divided by the rotary shaft. The first part may be movable to an upstream side of the passage when the valve disk is rotated from the closing position to the opening position, and the second part may be movable to the downstream side of the passage and the guide rib may protrude from the inner peripheral surface of the valve body to support a surface of the first part.

First and second parts of the valve disk may be divided by the rotary shaft. The first part may be movable to an upstream side of the passage when the valve disk is rotated from the closing position to the opening position and the second part may be movable to a downstream side of the passage, the guide rib may protrude from the inner peripheral surface of the valve body to support a surface of the second part.

When viewed in the first direction, the guide rib may be disposed in a third direction that is perpendicular to the second direction or a direction opposite to the third direction, from an imaginary reference line passing the rotary shaft in the second direction.

When viewed in a direction of the rotary shaft, the valve disk may define the closing position in a state, in which the valve disk is rotated by a specific angle in a direction relative to an imaginary reference line passing through the rotary shaft in a third direction that us perpendicular to the first direction, the direction being a direction in which the valve disk is rotated from the closing position to the opening position.

An inner peripheral surface of the valve body may define the passage. A second rotational direction may be defined as a direction in which the valve disk is rotated from the closing position to the opening position. The valve body may include a stopper configured to protrude from the inner peripheral surface of the valve body to prevent the valve disk from being rotated in the second rotational direction at the opening position.

When viewed in the first direction, the stopper may be spaced apart from an imaginary center line passing through the passage in the second direction in a direction that is perpendicular to the second direction.

The solenoid coil may apply currents of opposite directions when the valve disk at the closing position is moved to the opening position and the valve disk at the opening position is moved to the closing position.

The opening/closing valve may further include a torsion spring configured to provide an elastic force to cause, the valve disk to be rotated from the opening position to the closing position or to cause the valve disk to be rotated from the closing position to the opening position.

According to an aspect of the present disclosure, an opening/closing valve may include a valve body defining a passage through which a fluid can flow in a first direction, and a valve disk including a magnetic substance disposed at a location within the passage, the valve disk rotatable about a rotary shaft between a closing position and an opening position, wherein the rotary shaft extends in a second direction that is perpendicular to the first direction. The opening/closing valve may be configured so that flow of the fluid flowing through the passage is blocked when the valve disk is in the closing position and the flow of the fluid flowing through the passage is allowed when the valve disk is in the opening position. The opening/closing valve may include a solenoid coil mounted outside the passage to surround the location within the passage in which the valve disk is disposed.

A surface of the valve disk that faces a downstream side of the passage at the closing position, may include a magnetic substance of a first pole and a surface of the valve disk that faces an upstream side of the passage at the closing position, may include a magnetic substance of a second pole that is opposite to the first pole.

When viewed in a direction of the rotary shaft, the rotary shaft may be spaced apart from an imaginary reference line extending in a direction that is perpendicular to the first direction and provided at the same distance from a surface facing the first direction toward the downstream side of the passage at the closing position and a surface facing an opposite direction to the first direction toward the upstream side of the passage at the closing position, in the first direction or a direction opposite to the first direction.

The opening/closing valve may further include a seat member configured to seat the valve disk between an inner peripheral surface of the valve body that defines the passage and at the closing position.

The seat member may include a seat surface configured to be inclined toward an inside of the passage with respect to the first direction, when viewed in a direction of the rotary shaft, to prevent the valve disk at the closing position from being rotated in a first rotational direction, in which the valve disk is rotated from the opening position to the closing position, and the valve disk may include a contact surface formed to correspond to the seat surface to contact the seat surface at the closing position.

According to an aspect of the present disclosure, an opening/closing valve may include a valve body defining a passage through which a fluid can flow in a first direction, a solenoid coil mounted on the valve body along the first direction to surround the passage on an outside of the passage and a valve disk located within the passage. The valve disk may be rotatable about a rotary shaft extending in a second direction that is perpendicular to the first direction, wherein the valve disk is rotatable between a closing position and an opening position. The opening/closing valve may be configured so that flow of the fluid flowing through the passage is blocked when the valve disk is in the closing position and the flow of the fluid flowing through the passage is allowed when the valve disk is in the opening position. The valve disk comprises a first part and a second part that are divided by the rotary shaft, wherein the first part is movable to a downstream side of the passage when the valve disk is rotated from the closing position to the opening position, wherein the second part is movable to an upstream side of the passage. The first part may include a magnetic substance of a first pole and the second part may include a magnetic substance of a second pole that is an opposite pole to the first pole.

An inner peripheral surface of the valve body may define the passage. A second rotational direction may be defined as a direction in which the valve disk is rotated from the closing position to the opening position. The valve body may include a stopper protruding from the inner peripheral surface of the valve body to prevent the valve disk from being rotated in the second rotational direction from the opening position.

when viewed in the first direction, the stopper may be disposed on an imaginary reference line passing through the rotary shaft in the second direction.

BRIEF DESCRIPTION OF THE DRAWINGS

The above and other objects, features and advantages of the present disclosure will be more apparent from the following detailed description taken in conjunction with the accompanying drawings.

DETAILED DESCRIPTION

Figure 1:
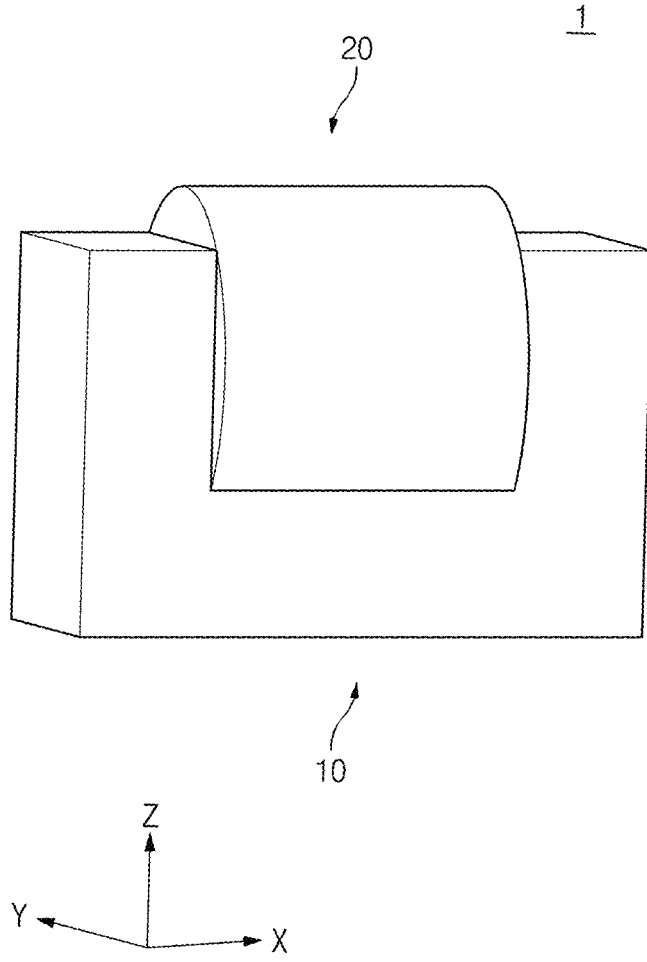
FIG. 1 is a perspective view of an opening/closing valve according to an embodiment of the present disclosure.

Hereinafter, some embodiments of the present disclosure will be described in detail with reference to the exemplary drawings. In adding the reference numerals to the components of each drawing, it should be noted that the identical or equivalent component is designated by the identical numeral even when they are displayed on other drawings. Further, in describing the embodiment of the present disclosure, a detailed description of well-known features or functions will be ruled out in order not to unnecessarily obscure the gist of the present disclosure.

In describing the components of the embodiment according to the present disclosure, terms such as first, second, "A," "B," "(a)," "(b)," and the like may be used. These terms are merely intended to distinguish one component from another component, and the terms do not limit the nature, sequence or order of the constituent components. Unless otherwise defined, all terms used herein, including technical or scientific terms, have the same meanings as those generally understood by those skilled in the art to which the present disclosure pertains. Such terms as those defined in a generally used dictionary are to be interpreted as having meanings equal to the contextual meanings in the relevant field of art, and are not to be interpreted as having ideal or excessively formal meanings unless clearly defined as having such in the present application.

Hereinafter, embodiments of the present disclosure will be described in detail with reference to FIGS. 1 to 29.

Figure 2:
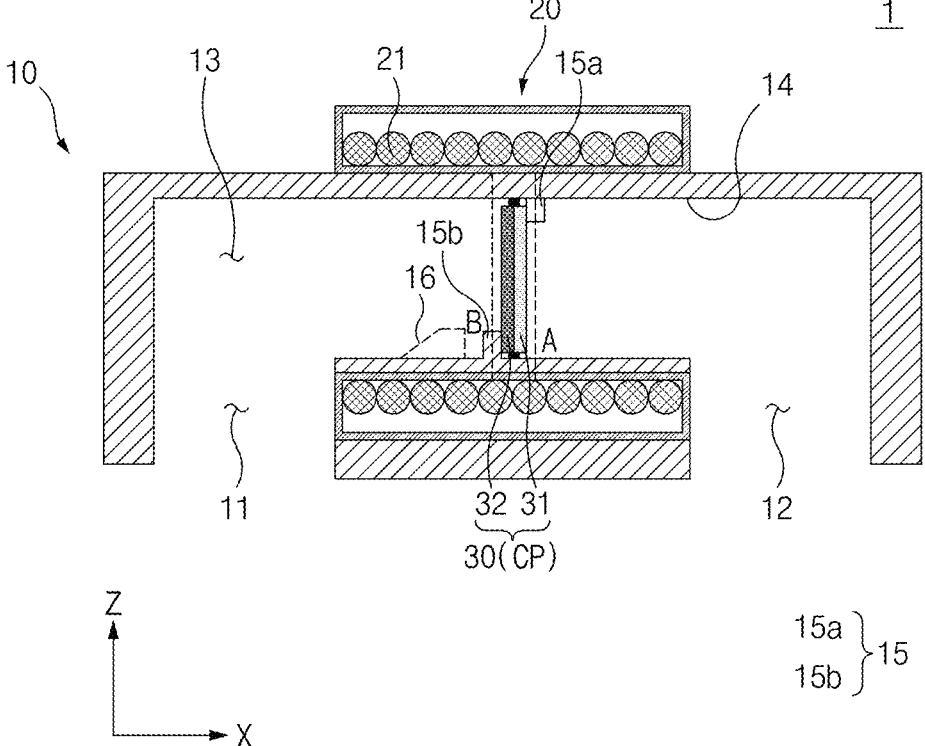
FIG. 2 is a side cross-sectional view of an opening/closing valve when a valve disk is in a closed state according to an embodiment of the present disclosure.
Figure 3:
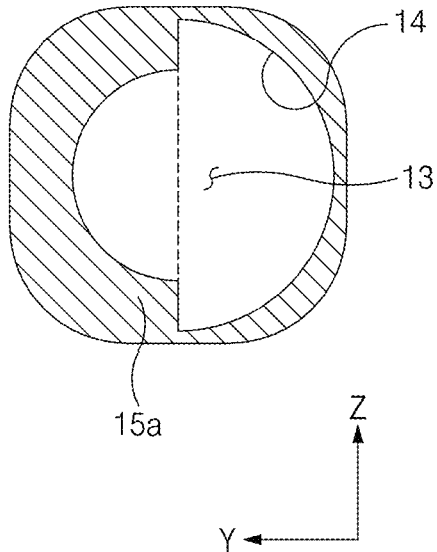
FIG. 3 is an enlarged view of a cross section along line "A" of FIG. 2, viewed in a first direction.
Figure 4:
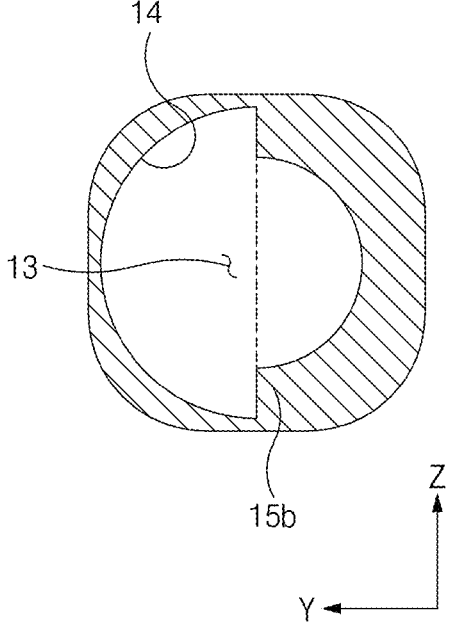
FIG. 4 is an enlarged view of a cross section along line "B" of FIG. 2, viewed in a first direction.
Figure 5:
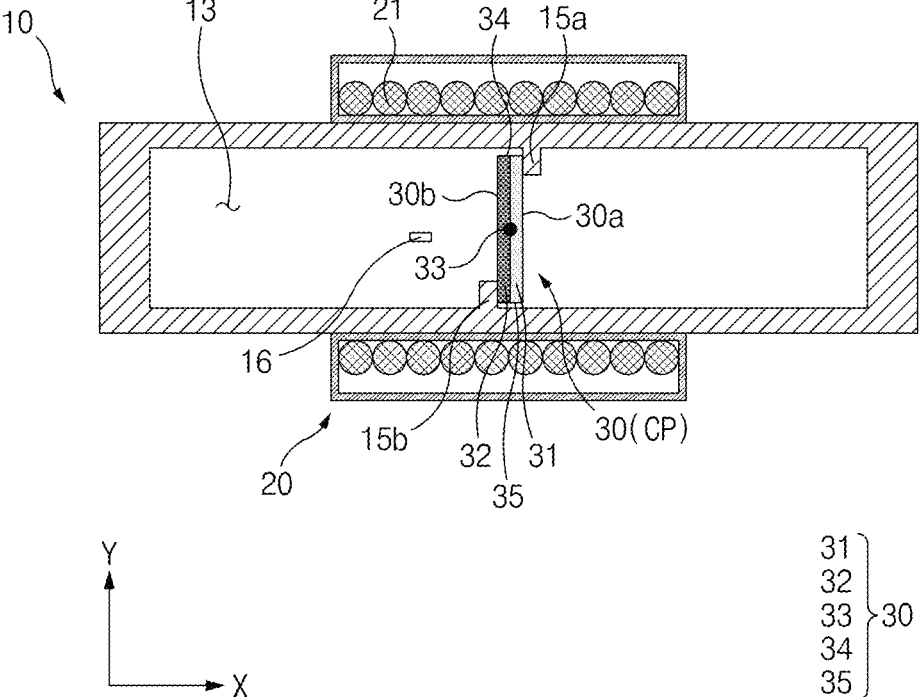
FIG. 5 is a cross-sectional view of an opening/closing valve, viewed in a direction of a rotary shaft of a valve disk when the valve disk is in a closed state according to an embodiment of the present disclosure.

FIG. 1 is a perspective view of an opening/closing valve according to an embodiment of the present disclosure. FIG. 2 is a side cross-sectional view of the opening/closing valve when a valve disk is in a closed state according to an embodiment of the present disclosure. FIG. 3 is an enlarged view of a cross section along line "A" of FIG. 2, viewed in a first direction. FIG. 4 is an enlarged view of a cross section along line "B" of FIG. 2, viewed in the first direction. FIG. 5 is a cross-sectional view of the opening/closing valve, viewed in a direction of a rotary shaft of the valve disk when the valve disk is in a closed state according to an embodiment of the present disclosure.

Referring to FIGS. 1 to 5, an opening/closing valve 1 may be understood as a valve that adjusts a flow rate of a fluid that flows through a passage 13 by rotating a valve disk 30 that is disposed on the passage 13 in a valve body 10.

The opening/closing valve 1 may include the valve body 10 that defines the passage 13, through which the fluid flows in a first direction (the "X" direction), the valve disk 30 that is configured to be rotated on the passage 13 to open and close the passage 13, and a solenoid housing 20 that covers a solenoid coil 21 that is provided on an outside of the passage 13 to rotate the valve disk 30.

The valve body 10 includes the passage 13 that extends in the first direction (the "X" direction) between an inlet 11 provided on an upstream side of the passage 13 and an outlet 12 provided on a downstream side of the passage 13, and an inner peripheral surface 14 that defines the passage 13.

The solenoid housing 20 may protect the solenoid coil 21 that is mounted on the valve body 10 to surround the passage 13 that extending in the first direction (the "X" direction) from an outside of the passage 13. The solenoid housing 20 may be formed in a substantially hollow cylindrical shape.

The valve disk 30 may be provided in an interior of the solenoid coil 21 to open and close the passage 13 while being rotated by the solenoid coil 21. The valve disk 30 may be rotated about a rotary shaft 33 that extends in a second direction (the "Z" direction) that is perpendicular to the first direction (the "X" direction), between a closing position CP that blocks flow of a fluid that flows through the passage 13 and an opening position OP that allows the flow of the fluid that flows through the passage 13. The valve disk 30 may be rotated between the closing position CP and the opening position OP (see FIG. 12), depending on a direction of a current applied to the solenoid coil 21.

To have this structure, the valve disk 30 may include a magnetic substance to open and close the passage 13 whereby magnetic fields are formed with opposite poles, and the valve disk may have a shape of a cylindrical disk.

That is, the valve disk 30 is formed in a shape corresponding to the passage 13 and is configured to close the passage 13 at the closing position CP, and may include a first surface 30*a* that faces a downstream side of the passage 13 at the closing position CP, and a second surface 30*b* that is an opposite surface to the first surface 30*a*, which faces an upstream side of the passage 13 at the closing position CP.

The first surface 30*a* may include a magnetic substance of a first pole, and the second surface 30*b* may include a magnetic substance of a second pole. The first surface 30*a* and the second surface 30*b* may be formed to have opposite poles.

As illustrated in FIG. 5, the valve disk 30 is divided by the rotary shaft 33 and when viewed in a direction of the rotary shaft 33 at the closing position CP, and may include a first pole part 31 including the first surface 30*a* disposed on the downstream side of the passage 13 and a second pole part 32 including the second surface 30*b* disposed on the upstream side of the passage 13.

The rotary shaft 33 may be disposed between the first pole part 31 and the second pole part 32 such that the valve disk 30 is coupled to the inner peripheral surface of the valve body 10 to be rotatable.

The first pole part 31 provided with a first pole (an example: the "N" pole) and the second pole part 32 provided with a second pole (an example: "S" pole) that is opposite to the first pole may face opposite directions. Here, the first pole and the second pole may be one of the "N" pole and the "S" pole, respectively.

When the first pole part 31 is the "N" pole and the second pole part 32 is the "S" pole, a position of the valve disk 30 may be fixed at the closing position CP and may be rotated toward the opening position OP according to a direction of the current flowing into the solenoid coil 21.

The first pole part 31 of the valve disk 30 may be provided with the first pole, and the second pole part 32 may be provided with the second pole. By the magnetic field generated by the solenoid coil 21, the first pole part 31 may be disposed to face the second pole that is the opposite pole to the first pole, and the second pole part 32 may be disposed to face the first pole that is the opposite pole to the second pole. Rotation of the valve disk 30, which will be described later, may be rotation due to a magnetic force generated by the solenoid coil 21.

With regard to the rotation of the valve disk 30, a direction, in which the valve disk 30 is rotated from the opening position OP to the closing position CP may be a first rotational direction R1 (see FIG. 14) that is the clockwise direction when viewed in the direction of the rotary shaft 33, and a direction of rotation from the closing position CP to the opening position OP may be a second rotational direction R2 (see FIG. 7) that is the counterclockwise direction.

Hereinafter, for convenience, the first pole of the first pole part 31 may be understood as the "N" pole, and the second pole of the second pole part 32 may be understood as the "S" pole.

If a direction of a current that flows through the solenoid coil 21 is the counterclockwise direction when the solenoid coil 21 is viewed in the first direction (the "X" direction), a magnetic field of the first pole (an example: the "N" pole) is induced at a part of the solenoid coil 21 on a side that is close to the inlet 11, and a magnetic field of the second pole (an example: the "S" pole) may be induced at a part of the solenoid coil 21 on a side that is close to the outlet 12.

Then, a direction of the magnetic field formed by the solenoid coil 21 is a direction that exits from the "N" pole of the inlet 11 side part from the outside of the solenoid coil 21 and enters the "S" pole of the outlet 12 side part, and a direction of the magnetic field in an interior of the solenoid coil may be opposite to the first direction (the "X" direction) that faces the inlet 11 from the outlet 12.

In this case, the direction of the magnetic field formed by the solenoid coil 21 in the interior of the solenoid coil 21 is an opposite direction of the first direction (the "X" direction), and the magnetic field formed by the valve disk 30 may be formed in a direction that exits from the first pole part 31 of the valve disk and enters the second pole part 32.

Then, the direction of the magnetic field formed by the valve disk 30 and the direction of the magnetic field formed by the solenoid coil 21 may interfere with each other whereby the valve disk 30 may be rotated from an area, in which the magnetic field is dense, to an area, in which the magnetic field is sparse. Even when the direction of the magnetic field formed by the valve disk 30 and the direction of the magnetic field formed by the solenoid coil 21 interfere with each other, the valve disk 30 will not be rotated when the magnetic field does not have a dense or sparse area or is symmetrical.

According to the principle, when the valve disk 30 is viewed in the direction of the rotary shaft 33, the valve disk 30 may not be rotated by a magnetic force and a position thereof may be fixed when the first surface 30*a* and the second surface 30*b* face the first direction (the "X" direction) or the opposite direction (the –X direction) to the first direction.

Accordingly, to rotate the valve disk 30 as the direction of the current that flows into the solenoid coil 21 is changed, the valve disk 30 located at the closing position CP needs not to be parallel in the direction of the rotary shaft 33 when viewed in the direction of the rotary shaft 33.

To achieve this, as illustrated in FIG. 5, when the valve disk 30 located at the closing position CP is viewed in the direction of the rotary shaft 33, the valve disk 30 may be formed in a state, in which it is rotated in the second rotational direction R2, in which it is rotated from the closing position CP to the opening position OP that is parallel to the first direction (the "X" direction) by a specific angle on an imaginary reference line that passes through the rotary shaft 33 in a direction (the "Y" direction) that is perpendicular to the first direction (the "X" direction).

Meanwhile, when the valve disk 30 located at the closing position CP is viewed in the direction of the rotary shaft 33, the valve disk 30 may receive a magnetic force to be rotated because the valve disk 30 is not parallel to the third direction (the "Y" direction).

In more detail, the valve disk 30 may include, among two parts of the valve disk 30, which are divided by the rotary shaft 33, a first part 34 that is moved to the upstream side of the passage 13 when the valve disk 30 is rotated from the closing position CP to the opening position OP and a second part 35 that is moved to a downstream side of the passage when the valve disk 30 is rotated from the closing position CP to the opening position OP. Then, when viewed in the direction of the rotary shaft 33, the first part 34 and the second part 35 may receive a magnetic force to be rotated until they are located in parallel to a third direction (the "Y" direction), and to prevent this, the valve body 10 may include a guide rib 15 that protrudes from the inner peripheral surface 14 that defines the passage 13.

In other words, the guide rib 15 may protrude from the inner peripheral surface 14 to prevent the valve disk 30 located at the closing position CP from being rotated in the first rotational direction R1, in which it is rotated from the opening position OP to the closing position CP.

The guide rib 15 may include a first guide rib 15*a* that is configured to support the first part 34 of the valve disk 30 located at the closing position CP and a second guide rib 15*b* that is configured to support the second part 35 of the valve disk 30.

The first guide rib 15*a* may support a surface of the passage 13 of the first part 34, which faces the downstream side, when the valve disk 30 is located at the closing position CP, and the second guide rib 15*b* may support a surface of the passage 13 of the second part 35, which faces the upstream side when the valve disk is located at the closing position CP.

The first guide rib 15*a* and the second guide rib 15*b* may be spaced apart from each other in the first direction (the "X" direction). The first guide rib 15*a* and the second guide rib 15*b* may be disposed to be spaced apart from each other in the first direction such that the second part 35 of the valve disk 30 at the closing position CP is disposed to be disposed in the first direction (the "X" direction) of the first part 34.

In this way, when the valve disk 30 is located at the closing position CP due to the first guide rib 15*a* and the second guide rib 15*b*, the valve disk 30 may be disposed to be inclined while not being parallel to the third direction (the "Y" direction) that is perpendicular to the first direction (the "X" direction) and the second direction (the "Z" direction).

As illustrated in FIGS. 3 and 4, when viewed in the first direction (the "X" direction), the guide rib 15 may be disposed in the third direction (the "Y" direction) or the opposite direction (the –Y direction) of the third direction from the imaginary reference line that passes through the rotary shaft 33 in the second direction (the "Z" direction).

That is, the first guide rib 15*a* may be disposed in the third direction (the "Y" direction) of the imaginary reference line that passes through the rotary shaft 33, and the second guide rib 15*b* may be disposed in the third direction (the –Y direction) of the imaginary reference line that passes through the rotary shaft 33.

This is because the valve disk 30 may interfere with the first guide rib 15*a* or the second guide rib 15*b* not to be rotated when the first guide rib 15*a* or the second guide rib 15*b* crosses the imaginary reference line that passes through the rotary shaft 33.

In more detail, the first guide rib 15*a* may extend along a left semicircle of the inner peripheral surface 14, and the second guide rib 15*b* may extend along a right semicircle of the inner peripheral surface 14. However, the present disclosure is not limited thereto, and it is sufficient as long as the first guide rib 15*a* and the second guide rib 15*b* do not cross the imaginary reference line that passes the rotary shaft 33.

Although not illustrated in the drawings, a sealing member (not illustrated) formed of rubber or the like may be provided between the first part 34 of the valve disk 30 and the first guide rib 15*a*, and between the second part 35 of the valve disk 30 and the second guide rib 15*b*. The sealing member may be attached to the guide ribs 15*a* and 15*b* or the valve disk 30. The sealing member may seal an aperture between the valve disk 30 and the guide ribs 15*a* and 15*b* to prevent flow of the fluid more efficiently when the valve disk 30 is at the closing position CP.

Furthermore, the valve disk 30 may prevent the fluid from flowing through the passage 13 when it is located at the closing position CP, and then, the second surface 30*b* of the valve disk 30 may face the fluid that flows toward the valve disk 30, and thus, may be rotated in the first rotational direction R1. Also, in this case, the first guide rib 15*a* and the second guide rib 15*b* may prevent the valve disk 30 located at the closing position CP from being rotated in the first rotational direction R1, and thus, a position of the valve disk 30 may be fixed at the closing position CP.

According to the structure, because the apertures between the first part 34 of the valve disk 30 and the first guide rib 15*a* and between the second part 35 of the valve disk 30 and the second guide rib 15*b* may be relatively small or may not occur, an air-tightening performance of the valve disk 30 with the passage 13 may be improved.

Hereinafter, a process of rotating the valve disk 30 to the opening position OP by changing the direction of the current in the solenoid coil 21 will be described in detail.

Figure 6:
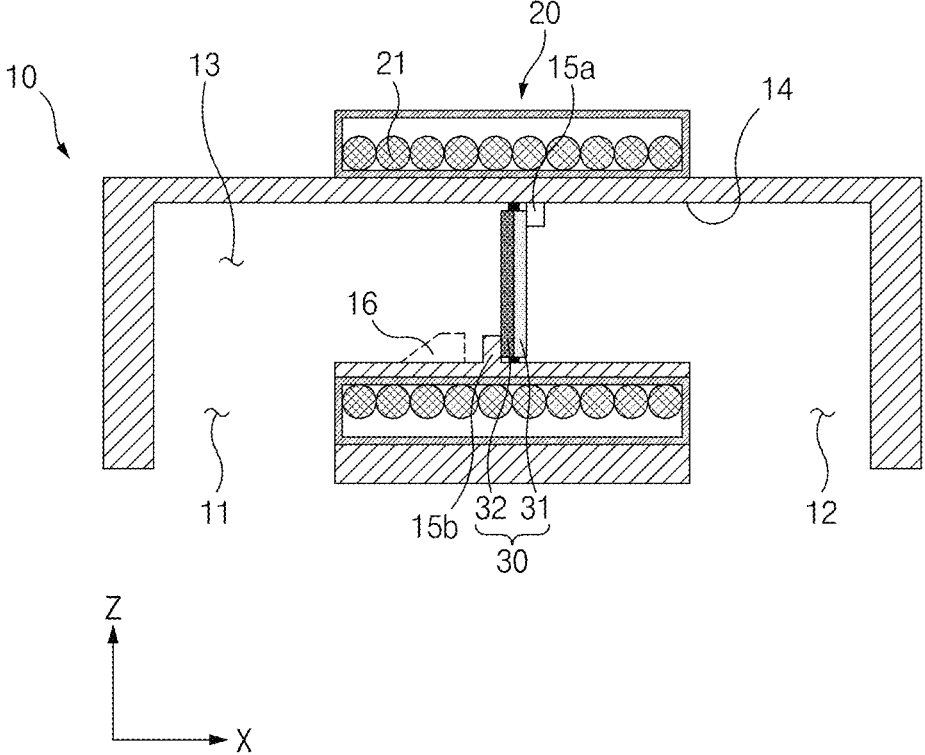
FIG. 6 is a side cross-sectional view of an opening/closing valve when the valve disk is rotated in a second rotational direction in a closed state according to an embodiment of the present disclosure.
Figure 7:
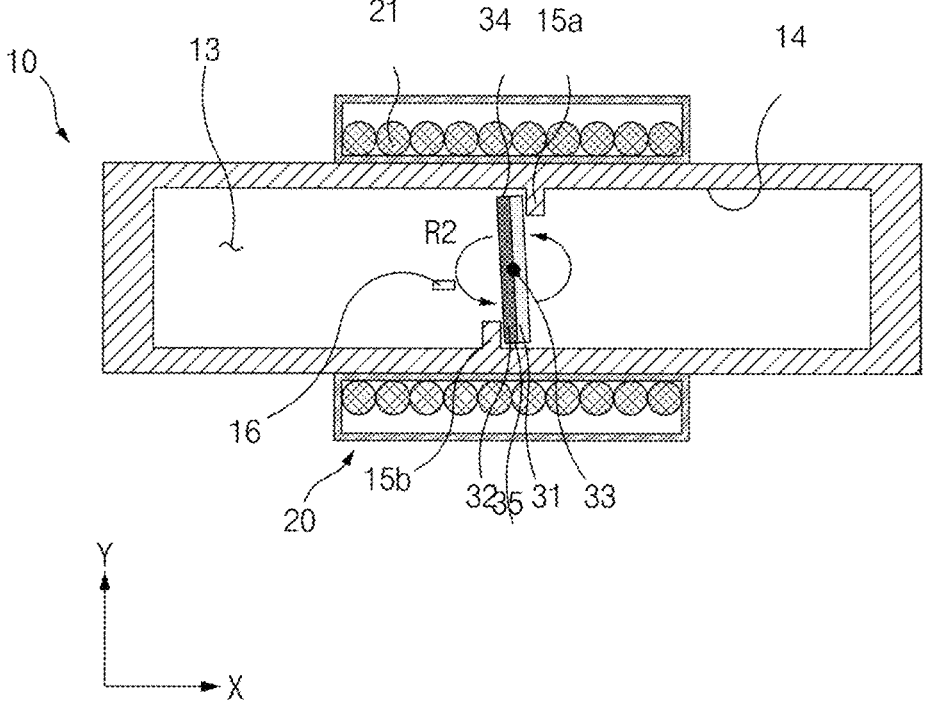
FIG. 7 is a cross-sectional view of an opening/closing valve, viewed in a direction of a rotary shaft of a valve disk, when a valve disk is rotated in a second rotational direction in a closed state according to an embodiment of the present disclosure.
Figure 8:
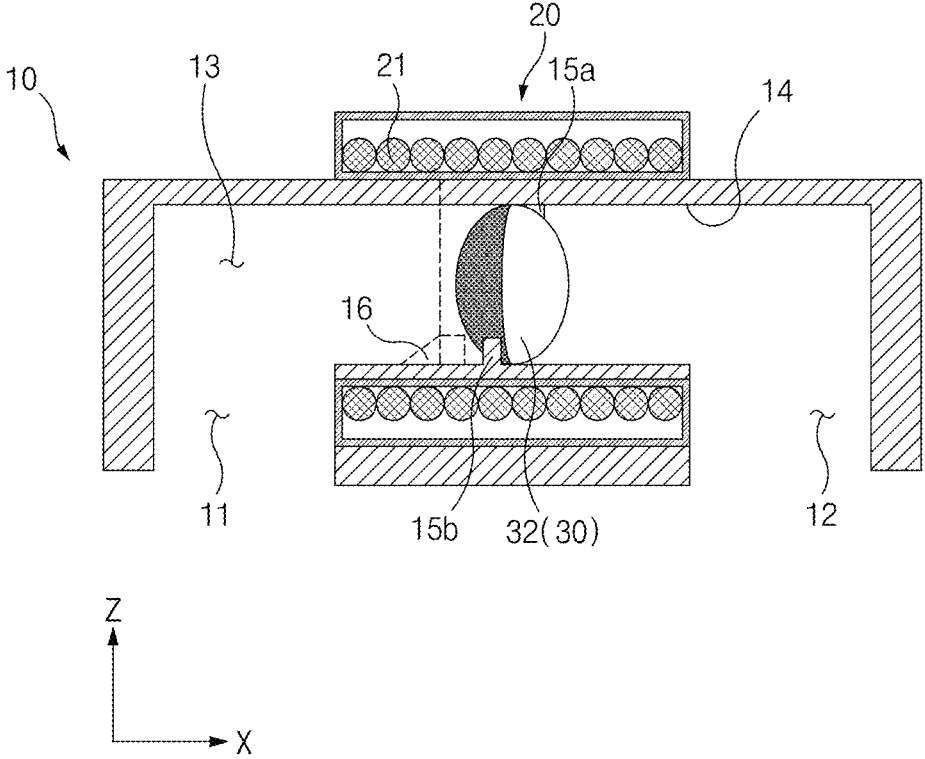
FIG. 8 is a side cross-sectional view of an opening/closing valve when a valve disk is rotated in a second rotational direction according to an embodiment of the present disclosure.
Figure 9:
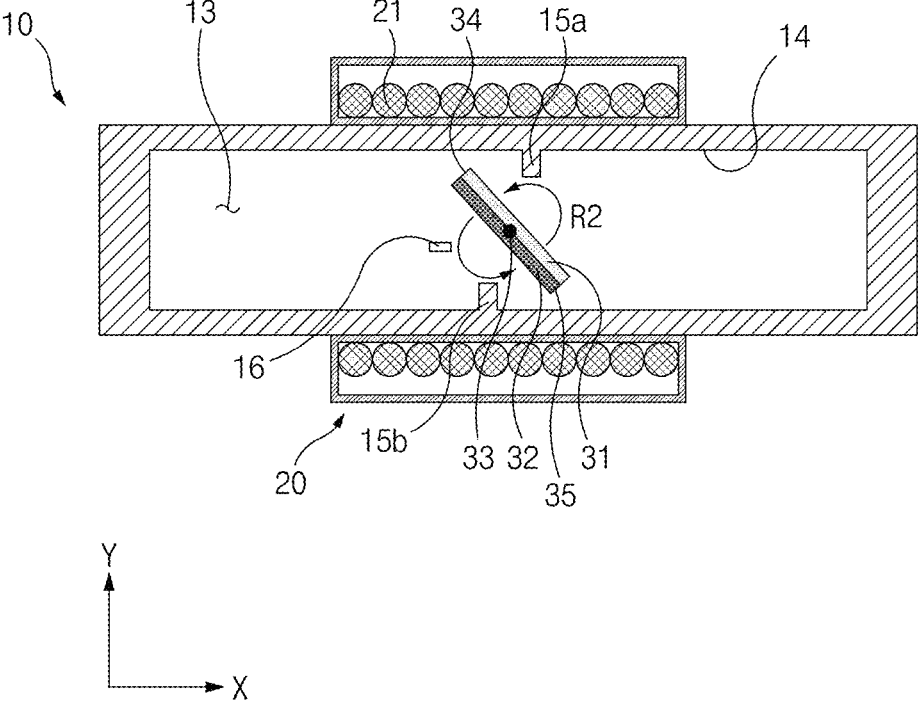
FIG. 9 is a cross-sectional view of an opening/closing valve, viewed in a direction of a rotary shaft of a valve disk when the valve disk is rotated in a second rotational direction according to an embodiment of the present disclosure.
Figure 10:
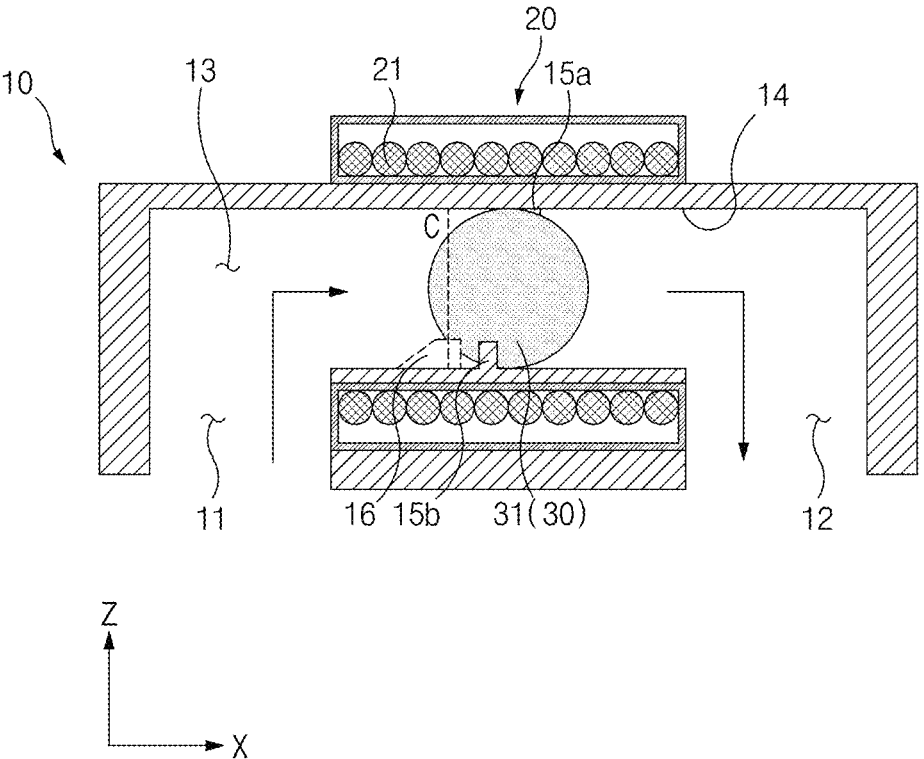
FIG. 10 is a side cross-sectional view of an opening/closing valve when a valve disk is in an open state according to an embodiment of the present disclosure.
Figure 11:
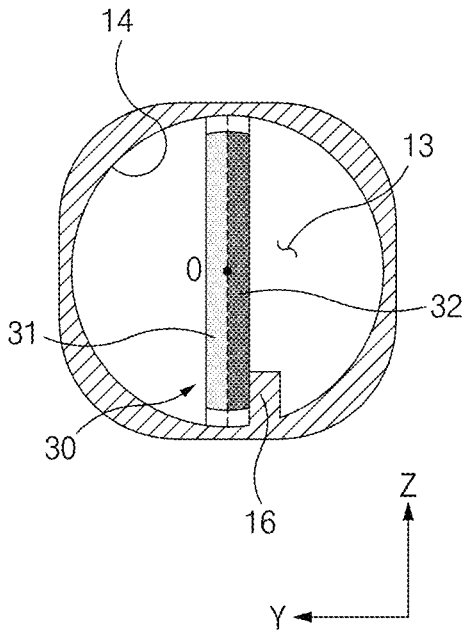
FIG. 11 is an enlarged view of a cross section taken along line "C" of FIG. 10, viewed from a first direction.
Figure 12:
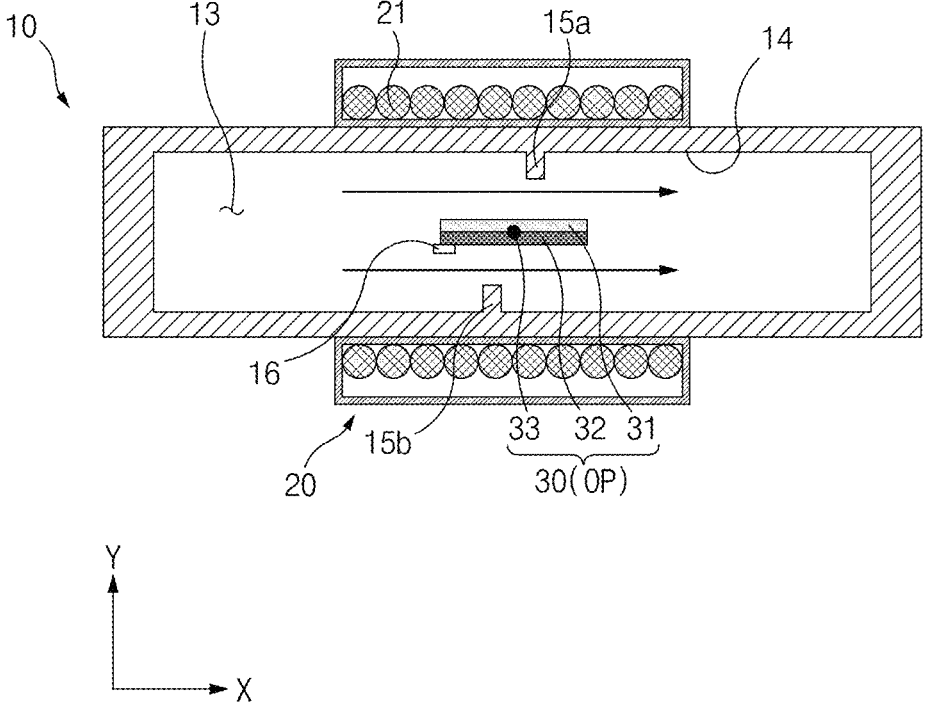
FIG. 12 is a cross-sectional view of an opening/closing valve, viewed in a direction of a rotary shaft of a valve disk, when the valve disk is in an open state according to an embodiment of the present disclosure.

FIG. 6 is a side cross-sectional view of the opening/closing valve when the valve disk is rotated in the second rotational direction in a closed state according to an embodiment of the present disclosure. FIG. 7 is a cross-sectional view of the opening/closing valve, viewed in the direction of the rotary shaft of the valve disk, when the valve disk is rotated in the second rotational direction in the closed state according to an embodiment of the present disclosure. FIG. 8 is a side cross-sectional view of the opening/closing valve when the valve disk is rotated in the second rotational direction according to an embodiment of the present disclosure. FIG. 9 is a cross-sectional view of the opening/closing valve, viewed in the direction of the rotary shaft of the valve disk when the valve disk is rotated in the second rotational direction according to an embodiment of the present disclosure. FIG. 10 is a side cross-sectional view of the opening/closing valve when the valve disk is in an open state according to an embodiment of the present disclosure. FIG. 11 is an enlarged view of a cross section taken along line "C" of FIG. 10, viewed from the first direction. FIG. 12 is a cross-sectional view of the opening/closing valve, viewed in the direction of the rotary shaft of the valve disk, when the valve disk is in the open state according to an embodiment of the present disclosure.

Meanwhile, referring to FIGS. 6 to 12, when the direction of the current that flows through the solenoid coil 21 is the clockwise direction when the solenoid coil 21 is viewed in the first direction (the "X" direction), a magnetic field of the second pole (an example: the "S" pole) may be induced in the part of the solenoid coil 21, which is close to the inlet 11, and a magnetic field of the first pole (an example: the "N" pole) may be induced in the part of the solenoid coil 21, which is close to the outlet 12.

That is, the solenoid coil 21 may be configured such that currents that flow in opposite directions are applied when the valve disk 30 at the closing position CP is moved in the second rotational direction R2 and when the valve disk 30 at the opening position OP is moved in the first rotational direction R1.

Also, in this case, the direction of the magnetic field in the solenoid coil 21, which is formed by the solenoid coil 21, may be the first direction (the "X" direction). Because the first pole part 31 of the valve disk 30 is provided with the first pole (an example: the "N" pole) and the second pole part 32 is provided with the second pole (an example: the "S" pole), the direction of the magnetic field formed by the valve disk 30 may be a direction that exits from the first pole part 31 and enters the second pole part 32.

Then, as illustrated in FIG. 7, the downstream side of the passage 13 with respect to the first part 34 becomes a relatively sparse area as compared with the downstream side of the passage 13 with respect to the second part 35, and the upstream side of the passage 13 with respect to the second part 35 becomes a relatively sparse area as compared with the upstream side of the passage 13 with respect to the first part 34. Accordingly, the valve disk 30 may receive a magnetic force such that it is rotated in the second rotational direction R2 that is the counterclockwise direction.

As the valve disk 30 is rotated in the second rotational direction R2, a difference between the dense area and the sparse area that are adjacent to the valve disk 30 becomes larger until it reaches the opening position OP whereby an intensity of the magnetic force received by the valve disk 30 may become gradually higher. The first part 34 of the valve disk 30 may be rotated toward a stopper 16 while the valve disk 30 is rotated in the second rotational direction R2.

The valve disk 30 may receive a magnetic force until the first pole part 31 faces the upstream side of the passage 13 and the second pole part 32 faces the downstream side of the passage 13. However, because the first surface 30*a* of the valve disk 30 may be a position, at which the passage 13 is opened most when it faces the third direction (the "Y" direction), the valve disk 30 may require a configuration for fixing the position thereof at the opening position OP.

To achieve this, the valve body 10 may include the stopper 16 that protrudes from the inner peripheral surface 14 to prevent the valve disk 30 from being rotated in the second rotational direction from the opening position OP.

The valve disk 30 may be rotated until the first part 34 of the valve disk 30 contacts the stopper 16 in the second rotational direction R2. A position of the valve disk 30, at which the valve disk 30 contacts the stopper 16, may be the opening position OP of the valve disk 30.

As illustrated in FIG. 11, when viewed in the first direction (the "X" direction), the stopper 16 may be spaced apart from the imaginary center line that passes a center "O" of the passage in the second direction (the "Z" direction), in a direction that is perpendicular to the second direction (the "Z" direction). The stopper 16 may be located on the right side (the –Y direction) of the imaginary center line. This is because the valve disk 30 is to be disposed on the imaginary center line that passes the center of the passage 13 in the second direction (the "Z" direction) at a moment, at which the valve disk 30 contacts the stopper 16.

In other words, the valve disk 30 may be at a position, at which the passage 13 is opened much, when it is located at the opening position OP. The stopper 16 may support the valve disk 30 to prevent the valve disk 30 at the opening position OP from being rotated in the second rotational direction R2.

The valve disk 30 that contacts the stopper 16 may continue to be located at the opening position OP as long as the direction of the current that flows through the solenoid coil 21 is not changed, and thus, the flow of the fluid may be induced through the opening/closing valve 1.

As described above, the closing position CP of the valve disk 30 may be a position rotated by a predetermined angle from the third direction (Y direction) perpendicular to the first direction (X direction) to the second rotational direction R2. The opening position OP of the valve disk 30 may be parallel to the first direction (X direction).

However, without being limited thereto, the closing position CP of the valve disk 30 may be a position parallel to the third direction (Y direction), and the opening position OP of the valve disk 30 may be a position parallel to the first direction (X direction).

The valve disk 30 may be rotated between 0 and 90 degrees clockwise relative to an imaginary line parallel to the first direction (X direction). The valve disk 30 may be rotated between 0 and 90 degrees clockwise or counterclockwise relate to an imaginary line parallel to the first direction (X direction) because of magnetic forces induced by the solenoid coil 21.

However, without being limited thereto, and the valve disk 30 may be rotated between a first position and a second position between the first direction (X direction) and the third direction (Y direction). Here, the first position may be a position rotated clockwise by a predetermined angle in the first direction (X direction) and the second position may be rotated by a predetermined angle in the third direction (Y direction). The valve disk 30 may be stopped at the first position and the second position because of the magnetic forces induced by the solenoid coil 21.

Hereinafter, a principle of rotating the valve disk 30 from the opening position OP to the closing position CP again will be described in detail.

Figure 13:
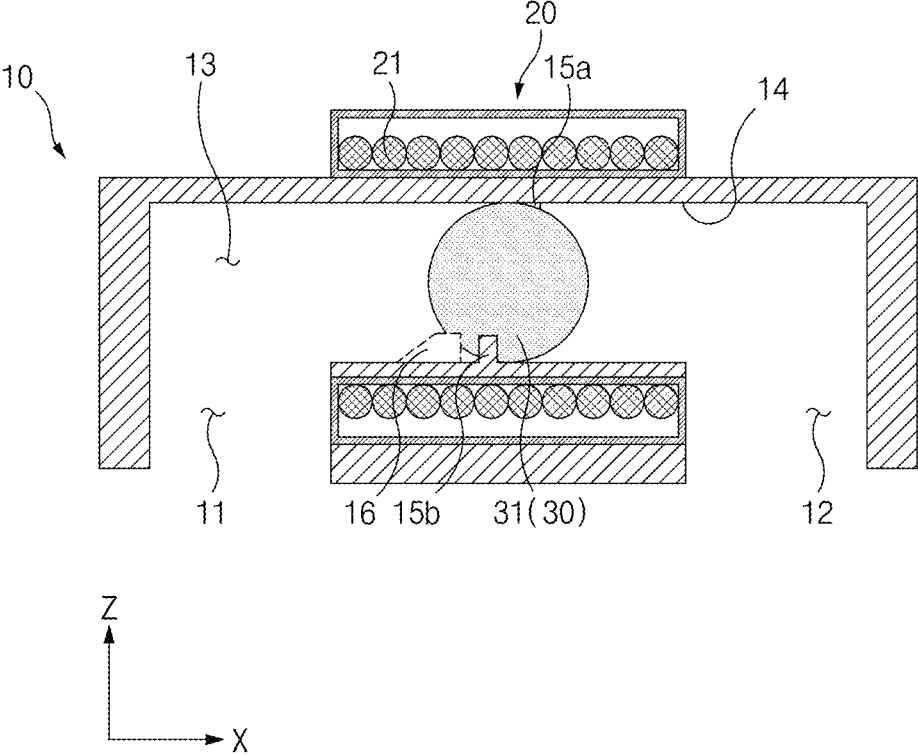
FIG. 13 is a side cross-sectional view of an opening/closing valve when a valve disk is rotated in a first rotational direction in an open state according to an embodiment of the present disclosure.
Figure 14:
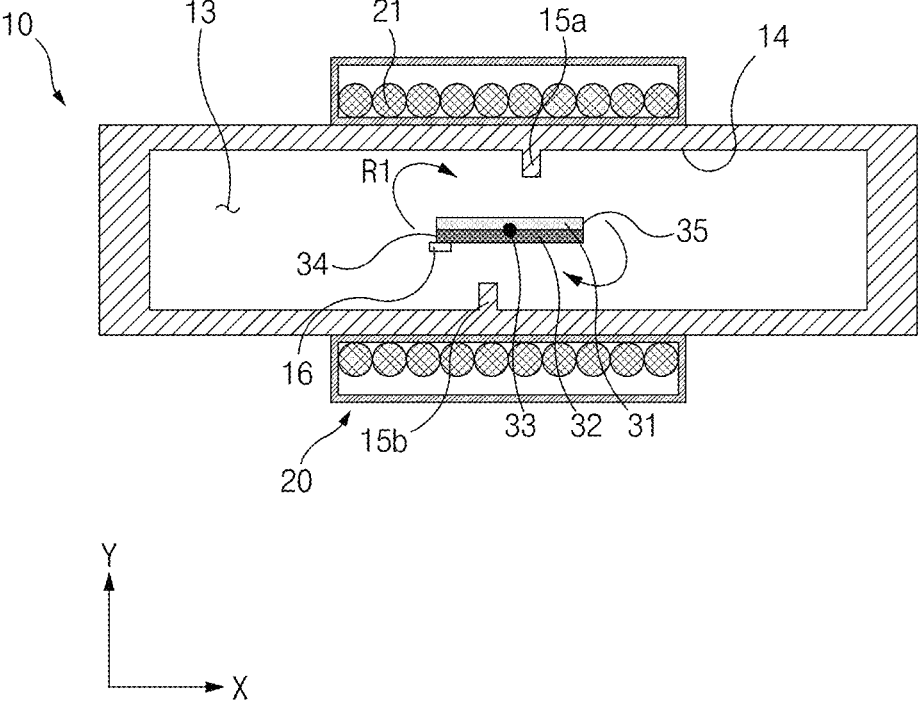
FIG. 14 is a cross-sectional view of an opening/closing valve, viewed in a direction of a rotary shaft of a valve disk when the valve disk is rotated in a first rotational direction in an open state according to an embodiment of the present disclosure.
Figure 15:
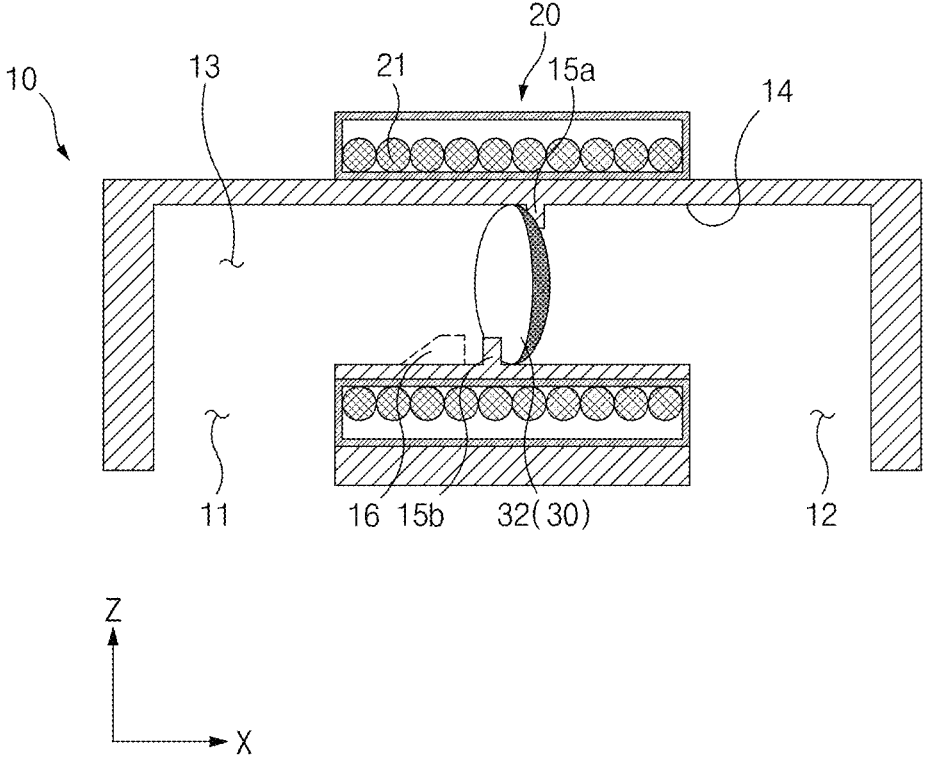
FIG. 15 is a side cross-sectional view of an opening/closing valve when a valve disk is rotated in a first rotational direction according to an embodiment of the present disclosure.
Figure 16:
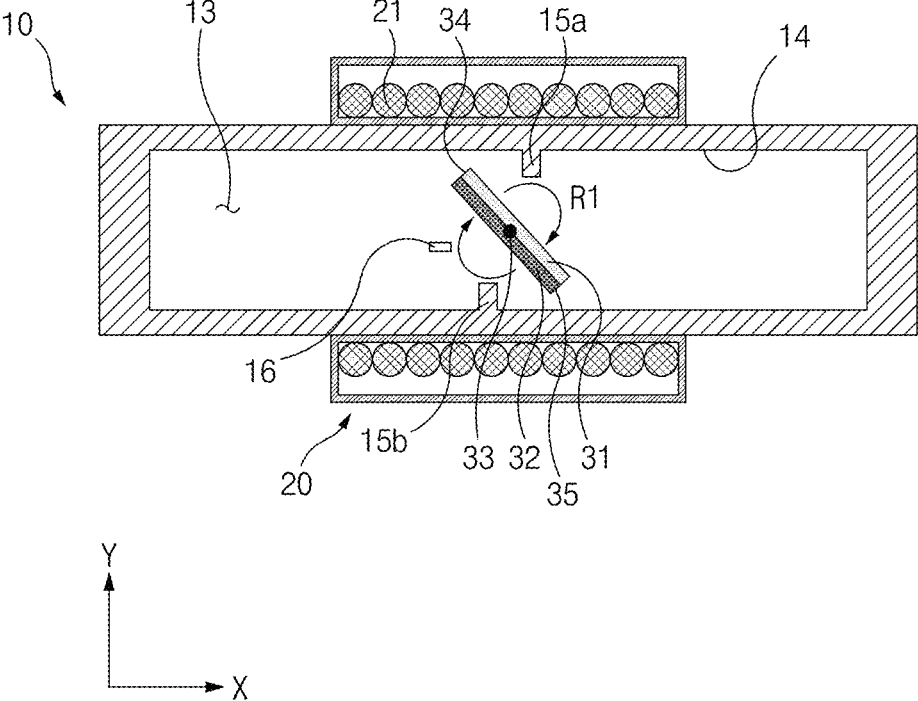
FIG. 16 is a cross-sectional view of an opening/closing valve, viewed in a direction of a rotary shaft of a valve disk when the valve disk is rotated in a first rotational direction according to an embodiment of the present disclosure.
Figure 17:
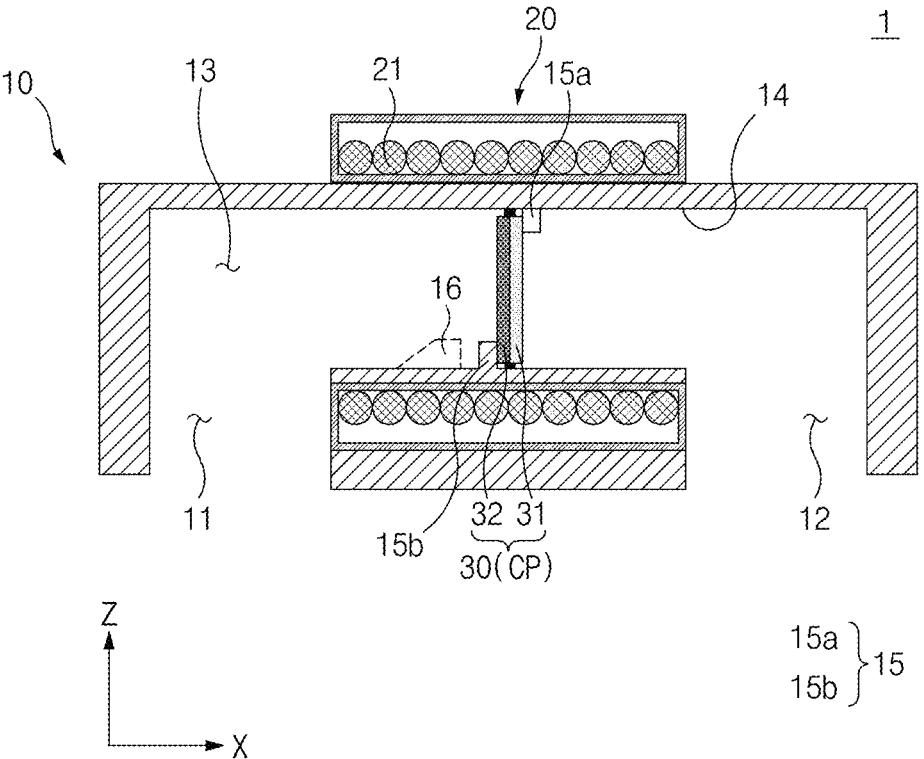
FIG. 17 is a side cross-sectional view of an opening/closing valve when a valve disk is in a closed state according to an embodiment of the present disclosure.
Figure 18:
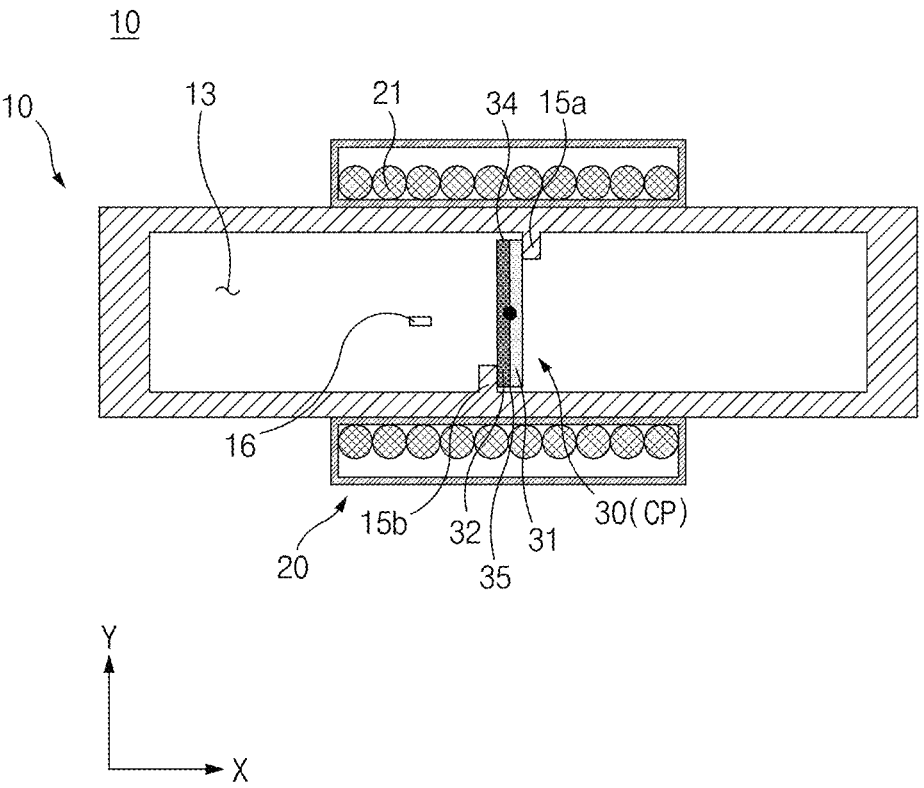
FIG. 18 is a cross-sectional view of an opening/closing valve, viewed in a direction of a rotary shaft of a valve disk when the valve disk is in a closed state according to an embodiment of the present disclosure.

FIG. 13 is a side cross-sectional view of the opening/closing valve when the valve disk is rotated in the first rotational direction in the open state according to an embodiment of the present disclosure. FIG. 14 is a cross-sectional view of the opening/closing valve, viewed in the direction of the rotary shaft of the valve disk when the valve disk is rotated in the first rotational direction in an open state according to an embodiment of the present disclosure. FIG. 15 is a side cross-sectional view of the opening/closing valve when the valve disk is rotated in the first rotational direction according to an embodiment of the present disclosure. FIG. 16 is a cross-sectional view of the opening/closing valve, viewed in the direction of the rotary shaft of the valve disk when the valve disk is rotated in the first rotational direction according to an embodiment of the present disclosure. FIG. 17 is a side cross-sectional view of the opening/closing valve when the valve disk is in the closed state according to an embodiment of the present disclosure. FIG. 18 is a cross-sectional view of the opening/closing valve, viewed in the direction of the rotary shaft of the valve disk when the valve disk is in the closed state according to an embodiment of the present disclosure.

Referring to FIGS. 13 to 18, the current applied through the solenoid coil 21 may be applied in an opposite direction to those of FIGS. 6 to 12. That is, when the solenoid coil 21 is viewed in the first direction (the "X" direction), a current may be applied in the counterclockwise direction of the solenoid coil 21 whereby the first pole (an example: the "N" pole) may be formed in a part that is close to the inlet 11 and the second pole (an example: the "S" pole) may be formed in a part that is close to the outlet 12.

The valve disk 30 located at the opening position OP may be rotated in the first rotational direction R1 from the stopper 16 because, due to the magnetic field, an area having a relatively sparse magnetic field may be formed on the downstream side of the passage 13 as compared with the upstream side of the passage 13 of the first pole part 31 and an area having a relatively sparse magnetic field may be formed on the upstream side of the passage 13 as compared with the downstream side of the passage 13 of the second pole part 32.

That is, the first part 34 of the valve disk 30 may be spaced apart from the stopper 16, and the first part 34 of the valve disk 30 may be rotated in the first rotational direction toward the first guide rib 15a. The first rotational direction R1 may be understood as an opposite direction to the second rotational direction R2, in which the valve disk 30 located at the closing position CP is rotated to be located at the opening position OP.

As the valve disk 30 is rotated about the rotary shaft 33 from the opening position OP to the closing position CP, the passage 13 is further closed whereby the flow of the fluid may stagnate.

As illustrated in FIGS. 17 and 18, when the first part 34 of the valve disk 30 contacts the first guide rib 15a and the second part 35 of the valve disk 30 contacts the second guide rib 15b, the valve disk 30 may be prevented from being rotated in the first rotational direction R1, and thus, the position of the valve disk 30 may be fixed at the closing position CP again.

As described above, the valve disk 30 may be rotated in the first rotational direction R1 from the opening position OP to the closing position CP, and may be rotated in the second rotational direction R2 from the closing position CP to the opening position OP.

As compared with when the valve disk 30 starts to be rotated in the first rotational direction R1 from the opening position OP to the closing position CP and starts to be rotated in the second rotational direction R2 from the closing position CP to the opening position OP, a magnitude of the current applied to the solenoid coil 21 may be relatively small while the valve disk 30 is rotated in the first rotational direction R1 and the second rotational direction R2.

Meanwhile, flow of the fluid through the passage 13 may be prevented while the valve disk 30 is located at the closing position CP, and accordingly, the fluid may stagnate to be frozen in a part that is close to the valve disk 30. Then, when a high voltage is applied to the solenoid coil 21, the fluid that flows through the passage 13 may be unfrozen. According to the structure, a high voltage may be applied to the solenoid coil 21 without any configuration, such as a separate heater whereby the fluid in the part that is close to the valve disk 30 may be unfrozen by using heating of the solenoid coil 21.

Figure 19:
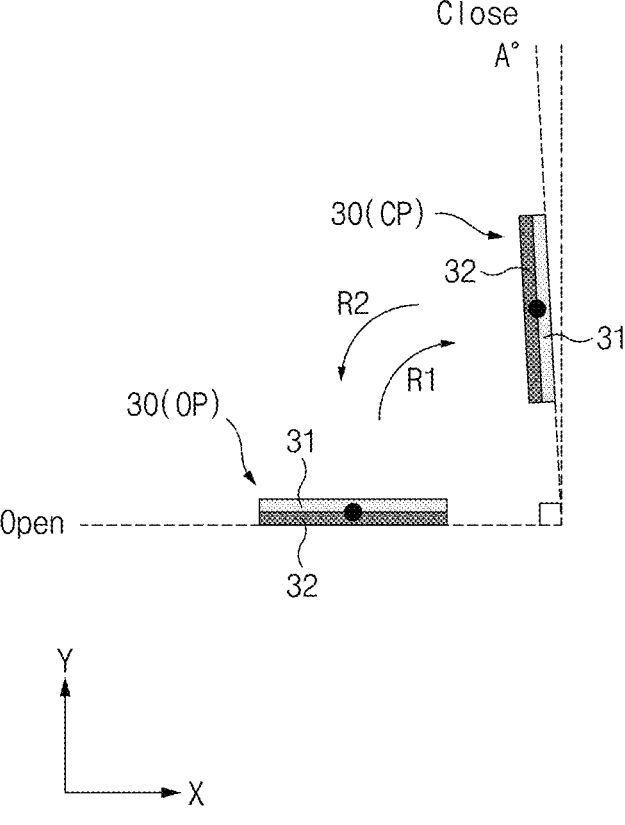
FIG. 19 is a schematic view of a valve disk in a closed state and an open state according to an embodiment of the present disclosure.
Figure 20:
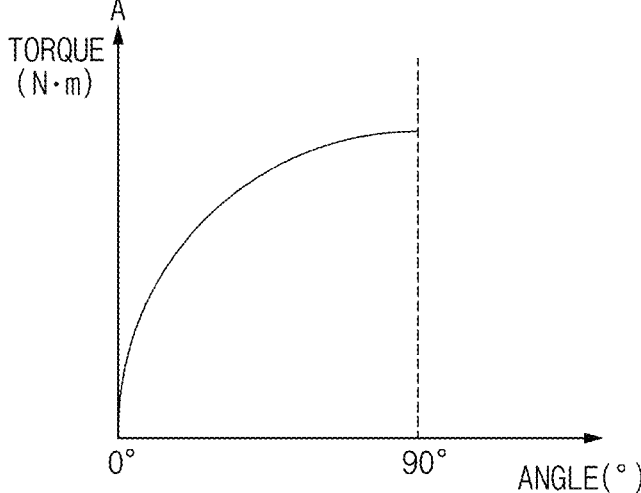
FIG. 20 is a schematic view of a torque for rotating a valve disk according to an embodiment of the present disclosure.

FIG. 19 is a schematic view of the valve disk in the closed state and the open state according to an embodiment of the present disclosure. FIG. 20 is a schematic view of a torque for rotating the valve disk according to an embodiment of the present disclosure.

Referring to FIGS. 19 and 20, angles when the valve disk 30 is at the opening position OP and at the closing position CP may be identified. When the valve disk 30 is at the opening position OP, the first pole part 31 and the second pole part 32 may be disposed to face each other in an opposite direction to the third direction (the "Y" direction).

The valve disk 30 may be rotated in the first rotational direction R1 from the opening position OP to the closing position CP whereby a position thereof may be fixed by the guide rib 15 (see FIG. 2). The valve disk 30 may be configured to be rotated from the opening position OP to the closing position CP by an angle that is smaller than 90 degrees in the first rotational direction R1. The valve disk 30 located at the closing position CP may be disposed at an angle that is rotated by about 87 degrees in the first rotational direction R1 with respect to the valve disk 30 located at the opening position OP.

Referring to FIG. 20, the angle of 0 degrees may correspond to when the first surface 30*a* (see FIG. 2) and the second surface 30*b* of the valve disk 30 face opposite directions in the first direction (the "X" direction), and the angle of 90 degrees may correspond to when the valve disk 30 is at the opening position OP. That is, the closing position CP of the valve disk 30 may correspond to about 3 degrees. As illustrated in FIG. 20, when an electric voltage is applied to the solenoid coil 21 to rotate the valve disk 30 at the closing position CP, a torque of the valve disk 30 by a magnetic force may become gradually higher as the valve disk 30 is rotated in the second rotational direction R2 from the closing position CP to the opening position OP.

Although not illustrated in the drawing, the torque for rotating the valve disk 30 may become gradually lower as the valve disk 30 is further rotated from the opening position OP in the second rotational direction R2 without any configuration of the stopper 16 (see FIG. 14).

However, it is not limited thereto, and the closing position CP of the valve disk 30 may be a position parallel to the third direction (Y direction) perpendicular to the first direction (X direction) and the opening position OP of the valve disk 30 may be a position parallel to the first direction (X direction).

However, without being limited thereto, and the valve disk 30 may be rotated between a first position and a second position between the first direction (X direction) and the third direction (Y direction). Here, the first position may be a position rotated clockwise by a predetermined angle in the first direction (X direction) and the second position may be rotated by a predetermined angle in the third direction (Y direction). The valve disk 30 may be stopped at the first position and the second position because of the magnetic forces induced by the solenoid coil 21.

Figure 21:
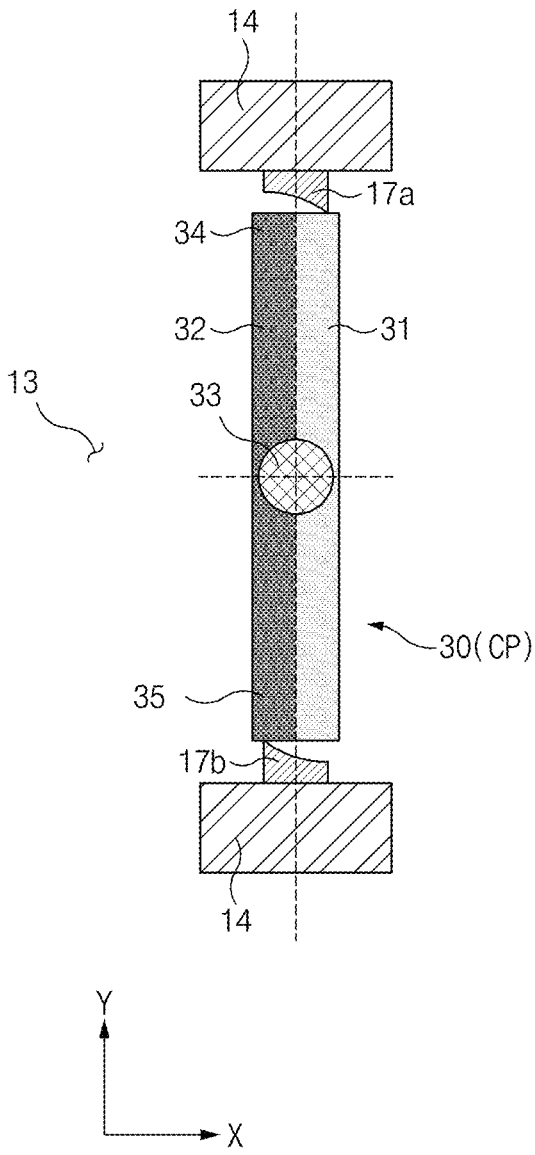
FIG. 21 is a schematic view of an opening/closing valve when a valve disk is in a closed state according to another embodiment of the present disclosure.

FIG. 21 is a schematic view of an opening/closing valve when a valve disk is in a closed state according to another embodiment of the present disclosure.

Referring to FIG. 21, when viewed in the direction of the rotary shaft 33, the valve disk 30 may be rotated through the rotary shaft 33 that is disposed on a boundary line between the first pole part 31 and the second pole part 32, which extends in the third direction (the "Y" direction) that is perpendicular to the first direction (the "X" direction). The inner peripheral surface 14 may be disposed on opposite sides in the first direction (the "X" direction) when the valve disk 30 is located at the closing position CP.

Then, the opening/closing valve 1 may further include seat members 17*a* and 17*b* that are configured such that the valve disk 30 is seated thereon, between the inner peripheral surface 14 and the valve disk 30 located at the closing position CP.

The first seat member 17*a* may be provided between the inner peripheral surface 14 and the first part 34 of the valve disk 30, and the second seat member 17*b* may be provided between the inner peripheral surface 14 and the second part 35 of the valve disk 30.

The seat members 17*a* and 17*b* may be understood as configurations that are provided between the valve disk 30 and the inner peripheral surface 14 to seal an aperture between the valve disk 30 and the valve body 10 and relatively reducing wear due to rotation of the valve disk 30.

Figure 22:
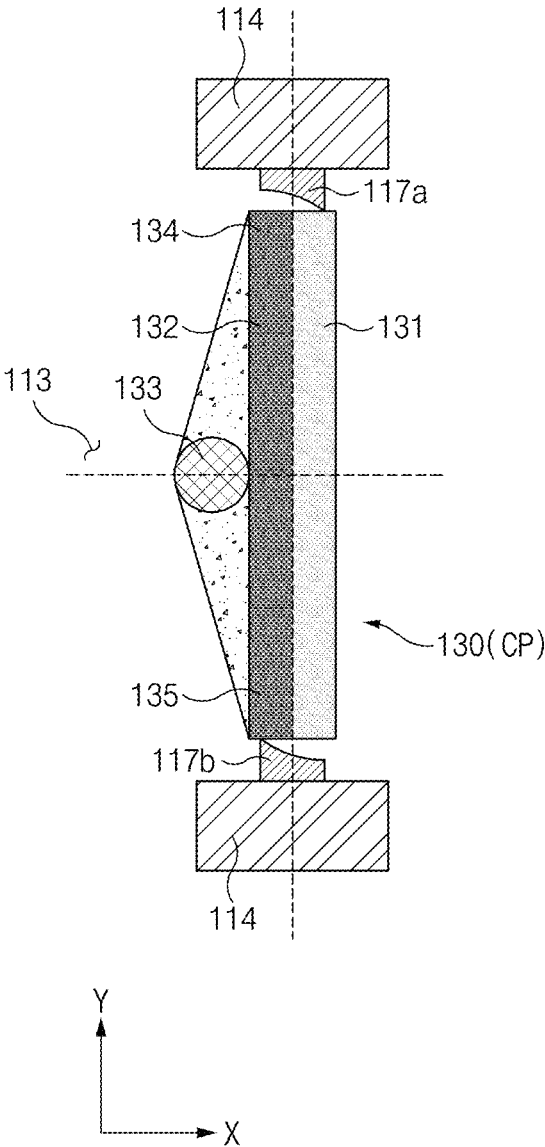
FIG. 22 is a schematic view of an opening/closing valve when a valve disk is in a closed state according to another embodiment of the present disclosure.

FIG. 22 is a schematic view of an opening/closing valve when a valve disk is in a closed state according to another embodiment of the present disclosure.

Referring to FIG. 22, a valve disk 130 may be different from the structure, in which the rotary shaft 33 of the above-described valve disk 30 is concentric to a rotational center of the valve disk 30.

When viewed in the direction of a rotary shaft 133, the rotary shaft 133 of the valve disk 130 may be spaced apart from the imaginary reference line that extends in a direction that is perpendicular to the first direction (the "X" direction) and is provided at the same distance from a surface of the valve disk 130, which faces the first direction (the "X" direction) toward the downstream side of the passage at the closing position CP and a surface thereof, which faces the opposite direction (the –X direction) to the first direction toward the upstream side of the passage, in the first direction (the "X" direction) or the opposite direction to the first direction (the "X" direction).

The valve disk 130 may be provided as a single offset valve that is disposed such that the rotary shaft 133 is biased in the opposite direction (the –X direction) to the first direction (the "X" direction) with respect to a first pole part 131 provided with the first pole and a second pole part 132 provided as the second pole that is the opposite pole to the first pole. The rotary shaft 133 of the valve disk 130 may be located at a center line of a passage 113, which extends in the first direction (the "X" direction).

The valve disk 130 may be symmetrically rotated with respect to the rotary shaft 133, and when the valve disk 130 is at the closing position CP, a first seat member 117*a* and a second seat member 117*b* for fixing the position of the valve disk 130 may be located on opposite sides of the valve disk 130.

The first seat member 117*a* and the second seat member 117*b* may protrude from an inner peripheral surface 114 of the valve body, which defines the passage 113, toward the passage 113. The first seat member 117*a* may be configured to support a first part 134 of the valve disk 130, which is located at the closing position CP, and the second seat member 117*b* may be configured to support a second part 135 of the valve disk 130, which is located at the closing position CP.

The seat members 117*a* and 117*b* may be provided with elastic members to allow soft rotation of the valve disk 130, and may seat an aperture between the valve disk 130 and the inner peripheral surface 114.

Figure 23:
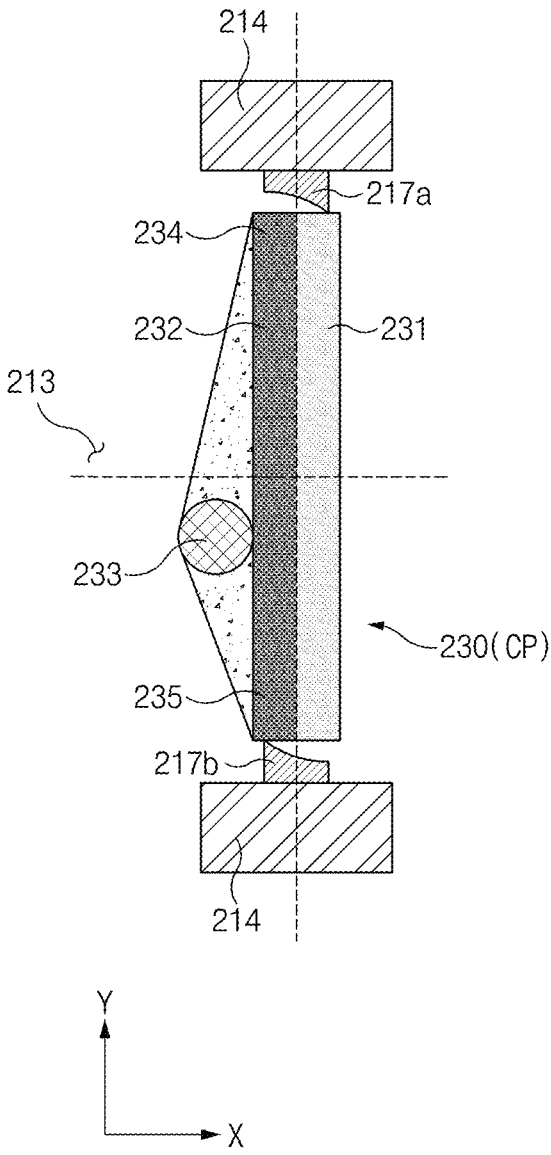
FIG. 23 is a schematic view of an opening/closing valve when a valve disk is in a closed state according to another embodiment of the present disclosure.

FIG. 23 is a schematic view of an opening/closing valve when a valve disk is in a closed state according to another embodiment of the present disclosure.

Referring to FIG. 23, a valve disk 230 may be different from the structure, in which the rotation center of the rotary shaft 33 of the above-described valve disk 30 is concentric.

A rotary shaft 233 may be spaced apart from the imaginary center line that passes through the center of the passage 13 in the first direction (the "X" direction), in the direction that is perpendicular to the first direction (the "X" direction) as compared with FIG. 22.

The valve disk 230 may be provided with a double offset valve that is disposed such that the rotary shaft 233 is biased in the opposite direction (the –X direction) to the first direction (the "X" direction) with respect to a first pole part 231 provided with the first pole and a second pole part 232 provided with the second pole that is the opposite pole to the first pole, and is disposed in the third direction (the "Y" direction) or the opposite direction (the –Y direction) to the third direction with respect to the center line that passes through the center of a passage 213 in the first direction (the "X" direction).

When the valve disk 230 is located at the closing position CP, seat members 217*a* and 217*b* that are configured such that the valve disk 230 is seated thereon may be provided on opposite sides of the valve disk 230.

The valve disk 230 as the double offset valve may have friction only while it is rotated about the rotary shaft 233 by about 10 degrees. In other words, an angle, at which the valve disk 230 receives friction due to the first seat member 217*a* provided between a first part 234 and an inner peripheral surface 214 and the second seat member 217*b* provided between the second part 235 and the inner peripheral surface 214, with respect to the rotational direction of the valve disk 230 may be relatively small as compared with that of the single offset valve.

That is, because the valve disk 230 may be rotated while receiving a lower frictional force as the passage 213 is opened and closed, a durability of the valve disk 230 may be improved, and thus, it may be easily used even when a fluid of a high pressure and a high temperature is opened and closed.

Figure 24:
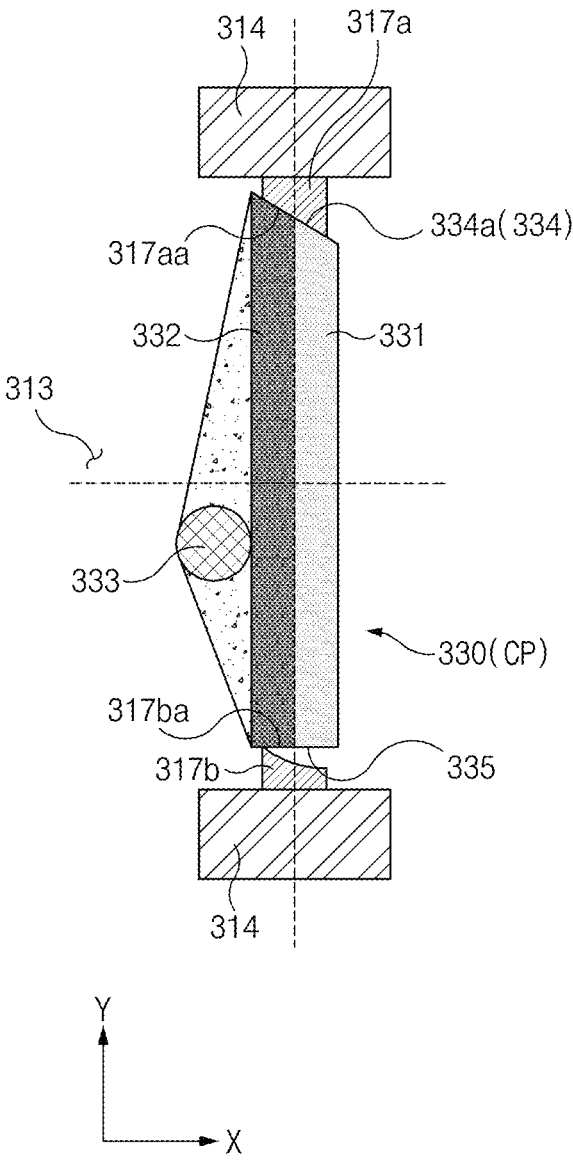
FIG. 24 is a schematic view of an opening/closing valve when a valve disk is in a closed state according to another embodiment of the present disclosure.

FIG. 24 is a schematic view of an opening/closing valve when a valve disk is in a closed state according to another embodiment of the present disclosure.

Referring to FIG. 24, a valve disk 330 may be a triple offset valve. A rotary shaft 333 of the valve disk 330 may correspond to a position of the rotary shaft 233 of the valve disk 230 (see FIG. 23) that is a double offset valve.

Hereinafter, only a structure of the valve disk 330 that is the triple offset valve, which is different from that of the valve disk 230 that is a double offset valve, will be described, and corresponding structures will be omitted.

When the valve disk 330 is located at the closing position CP, seat members 317*a* and 317*b* that are configured such that the valve disk 330 is seated thereon may be provided at opposite sides of the valve disk 330.

The first seat member 317*a* may be provided between an inner peripheral surface 314 and a first part 334 of the valve disk 330, which is located at the closing position CP. The second seat member 317*b* may be provided between the inner peripheral surface 314 and a second part 335 of the valve disk 330, which is located at the closing position CP.

The first seat member 317*a* may include a seat surface 317*aa* that is formed to be inclined toward an inside of a passage 313 with respect to the first direction (the "X" direction) to prevent the valve disk 330 at the closing position CP from being rotated in the first rotational direction, in which it is rotated from the opening position to the closing position CP.

Correspondingly, the valve disk 330 may include a contact surface 334*a* that is formed to correspond to the seat surface 317*aa* to contact the seat surface 317*aa* when it is located at the closing position CP. The contact surface 334*a* may be inclined along the imaginary center line that passes through the center of the passage 313 in the first direction (the "X" direction) toward the first direction (the "X" direction).

As the contact surface 334*a* is seated on the seat surface 317*aa* while the valve disk 330 is rotated in the first rotational direction to the closing position CP, rotation of the valve disk 330 may be stopped, and the passage 313 may be closed.

Then, the second part 335 of the valve disk 330 may be supported by a support surface 317*ba* of the second seat member 317*b*.

While the valve disk 330 that is the triple offset valve is rotated from the opening position OP to the closing position CP, the valve disk 330 may receive friction only when it contacts the seat members 317*a* and 317*b* whereby it may be understood as a structure having a relatively improved durability.

Accordingly, as the valve disk 330 opens and closes the passage 313, it may be rotated while receiving a low frictional force whereby it may be easily used even when a fluid of a high pressure and a high temperature is opened and closed.

Figure 25:
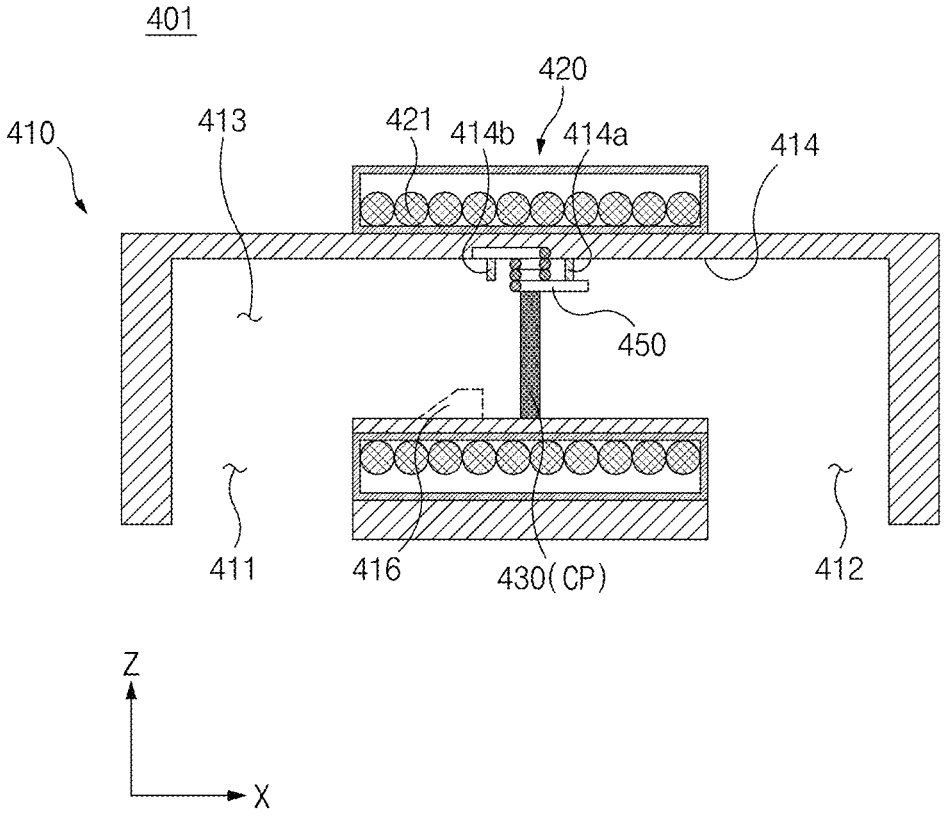
FIG. 25 is a side cross-sectional view of an opening/closing valve when a valve disk is in a closed state according to another embodiment of the present disclosure.

FIG. 25 is a side cross-sectional view of an opening/closing valve when a valve disk is in a closed state according to another embodiment of the present disclosure.

Referring to FIG. 25, an opening/closing valve 401 may include a valve disk 430 including a magnetic substance. The opening/closing valve 401 may include a steel plate instead of the structure of the first pole part 31 and the second pole part 32 of the above-described valve disk 30.

According to the structure, an electric voltage may be applied to a solenoid coil 421 only when the valve disk 430 is to be rotated from the closing position CP to the opening position.

That is, when an electric voltage is applied to the solenoid coil 421, a part that is close to an inlet 411 is formed with the first pole and a part that is close to an outlet 412 is formed with the second pole, and thus, the valve disk 430 may be rotated in the second rotational direction by about 90 degrees by the rotary shaft that passes through the valve disk 430 through an inner peripheral surface 414.

Then, the position of the valve disk 430 may be fixed at the opening position by a stopper 416. When the valve disk 430 is to return from the opening position to the closing position CP again, an electric voltage may not be applied to the solenoid coil 421.

The opening/closing valve 401 may include a torsion spring 450 that is coupled to the inner peripheral surface 414 and the valve disk 430. While the torsion spring 450 surrounds the valve disk 430, one end thereof may be coupled to a first support part 414a that protrudes from the inner peripheral surface 414 toward a passage 413 and an opposite end thereof may be coupled to a second support part 414b that is spaced apart from the first support part 414a while protruding from the inner peripheral surface 414.

The torsion spring 450 may provide an elastic force, by which the valve disk 430 is rotated, in a direction, in which the valve disk 430 is rotated from the opening position to the closing position CP.

According to the structure, the torsion spring 450 may provide a torque to the solenoid coil 421 to prevent rotation of the valve disk 430, and when an electric voltage is applied to the solenoid coil 421, that is, while a magnetic force is provided to the valve disk 430, the valve disk 430 may be prevented from being rotated in the first rotational direction that is a direction, in which it is rotated from the opening position to the closing position CP, and when an electric voltage is not applied to the solenoid coil 421, the valve disk 430 may be rotated in the first rotational direction by the torsion spring 450 such that the position thereof returns to the closing position CP.

In addition, in contrast, when an electric voltage is applied to the solenoid coil, the valve disk 430 may be moved from the opening position to the closing position CP, and the torsion spring 450 may provide an elastic force, by which the valve disk 430 is rotated from the closing position CP to the opening position.

According to the structure, rotation of the valve disk 430 may be guided by switching on or off the electric voltage applied to the solenoid coil 421 while not changing the direction of the current that flows to the solenoid coil 421.

Figure 26:
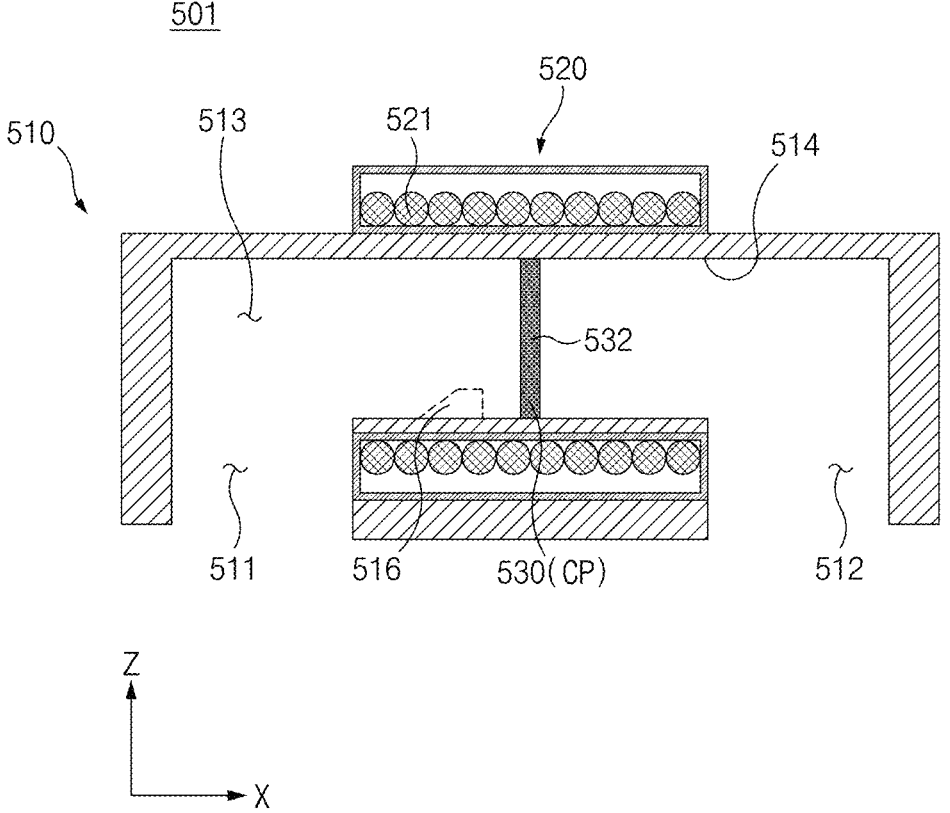
FIG. 26 is a side cross-sectional view of an opening/closing valve when a valve disk is in a closed state according to another embodiment of the present disclosure.
Figure 27:
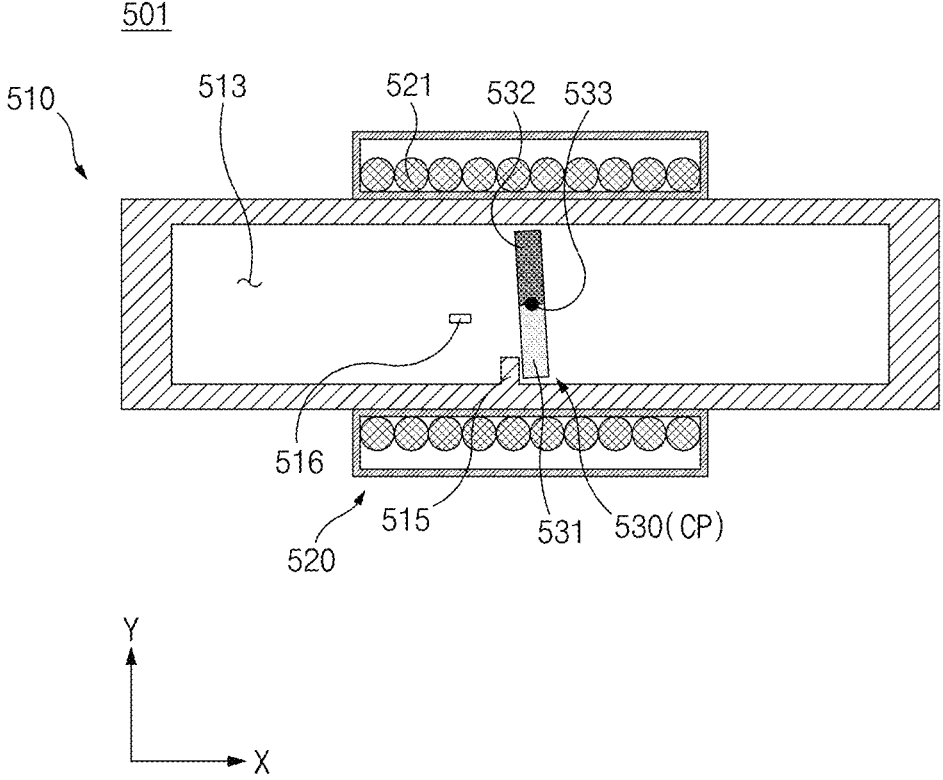
FIG. 27 is a cross-sectional view of an opening/closing valve, viewed in a direction of a rotary shaft of a valve disk when the valve disk is in a closed state according to another embodiment of the present disclosure.
Figure 28:
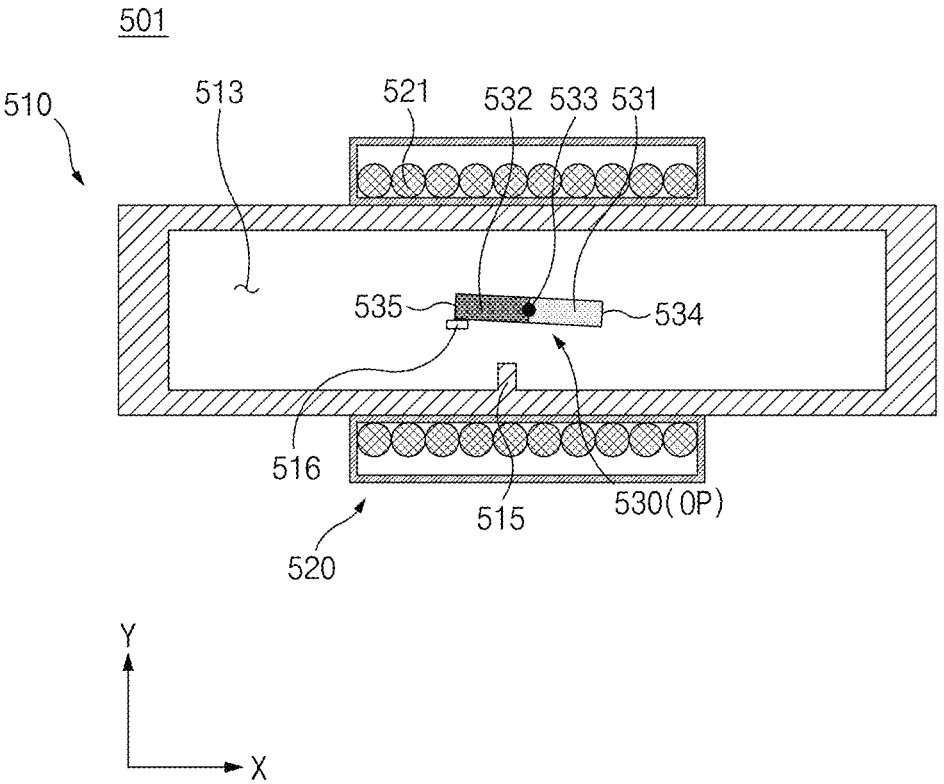
FIG. 28 is a cross-sectional view of an opening/closing valve viewed in a direction of a rotary shaft of a valve disk when the valve disk is in an open state according to another embodiment of the present disclosure.
Figure 29:
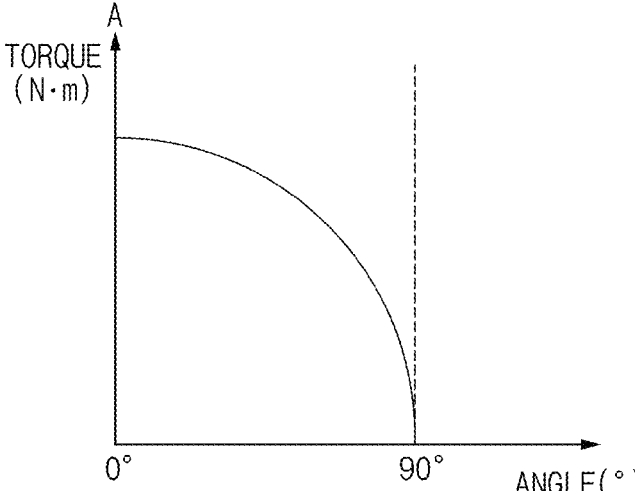
FIG. 29 is a schematic view of a torque for rotating a valve disk according to another embodiment of the present disclosure.

FIG. 26 is a side cross-sectional view of an opening/closing valve when a valve disk is in a closed state according to another embodiment of the present disclosure. FIG. 27 is a cross-sectional view of the opening/closing valve, viewed in a direction of a rotary shaft of the valve disk when the valve disk is in the closed state according to another embodiment of the present disclosure. FIG. 28 is a cross-sectional view of the opening/closing valve viewed in the direction of the rotary shaft of the valve disk when the valve disk is in an open state according to another embodiment of the present disclosure. FIG. 29 is a schematic view of a torque for rotating the valve disk according to another embodiment of the present disclosure.

Referring to FIGS. 26 to 29, a first pole part 531 of a valve disk 530 of an opening/closing valve 501 may be provided with the first pole (an example: the "N" pole), and a second pole part 532 may be provided with the second pole (an example: the "S" pole).

That is, the valve disk 530 may include, among two parts of the valve disk 530 divided by a rotary shaft 533, a first part 534 that is moved to a downstream side of a passage 513 when the valve disk 530 is rotated from the closing position CP to the opening position OP and includes a magnetic substrate of the first pole, and a second part 535 that is moved to an upstream side of the passage 513 and includes a magnetic substrate of the second pole that is an opposite pole to the first pole.

The first pole part 531 may be the first part 534, and the second pole part 532 may be the second part 535.

When the valve disk 530 is at the closing position CP, the first part 534 of the valve disk 530 may be located in the first direction (the "X" direction) of the second part 535 of the valve disk 530.

When a current that flows in the counterclockwise direction is applied to a solenoid coil 521 when viewed in the first direction (the "X" direction) while the valve disk 530 is located at the closing position CP, the first pole (an example: the "N" pole) may be formed at a part that is close to an inlet 511 and the second pole (an example: the "S" pole) may be formed at a part that is close to an outlet 512.

Then, an area having a relatively sparse magnetic field may be provided on the downstream side of the passage rather than on the upstream side of the passage 13 with respect to the first pole part 531 of the valve disk 530, and an area having a relatively sparse magnetic field may be provided on the upstream side of the passage 13 rather than on the downstream side of the passage 13 with respect to the second pole part 532.

Accordingly, the first pole part 531 of the valve disk 530 may be rotated from the upstream side to the downstream side of the passage 513, and the second pole part 532 may be rotated from the downstream side to the upstream side of the passage 513. That is, the valve disk 530 may receive a torque in the second rotational direction that is a direction, in which it is rotated from the closing position CP to the opening position OP.

The second part 535 of the valve disk 530 may be rotated until it contacts a stopper 516 disposed on the imaginary center line that passes through the center of the passage 513 in the first direction (the "X" direction) along the second rotational direction. Although not illustrated, when viewed in the first direction (the "X" direction), the stopper 516 may be disposed on the imaginary reference line that passes through the rotary shaft 533 in the second direction (the "Z" direction).

At a moment, at which the second part 535 of the valve disk 530 contacts the stopper 516, the valve disk 530 may be located at the opening position OP. The valve disk 530 may be rotated in the second rotational direction until it is prevented from being rotated in the second rotational direction, by the stopper 516.

The stopper 516 may be disposed at a center line that passes through a center of the passage 513 in the first direction (the "X" direction) and the opening position OP of the valve disk 530 may be disposed not to be parallel to the first direction (the "X" direction).

Meanwhile, when a current that flows in the clockwise direction is applied to the solenoid coil 521 when viewed in the first direction (the "X" direction), the first pole (an example: the "N" pole) is formed at a part that is close to the outlet 512 and the second pole (an example: the "S" pole) is formed at a part that is close to the inlet 511 whereby the valve disk 530 may be rotated in the first rotational direction that is a direction, in which it is rotated from the opening position OP to the closing position CP.

Then, the valve disk 530 may be rotated in the first rotational direction until the first part 534 contacts a guide rib 515.

That is, the valve disk 530 may be at the closing position CP when the first part 534 is stopped by the guide rib 515, and may be at the opening position OP when the second part 535 of the valve disk 530 is stopped by the stopper 516.

Referring to FIG. 29, the angle may be close to 90 degrees when the valve disk 530 is at the opening position OP, and the angle may be 0 degrees or close to 0 degrees when the valve disk 530 is at the closing position CP.

However, it is not limited thereto, and the closing position CP of the valve disk 530 may have an angle of a first predetermined degree and the opening position OP of the valve disk 530 may have an angle of a second predetermined degree which is larger than the first predetermined degree.

Under the structure of the valve disk 530, a torque for rotating the valve disk 530 to the opening position OP may be highest at a moment, at which an electric voltage is applied to the solenoid coil 521 when the valve disk 530 is at the closing position CP, and may be gradually lower as the valve disk 530 is rotated from the opening position OP to the second rotational direction.

Furthermore, even when the valve disk 530 is located at the opening position OP, the valve disk 530 is disposed not to be parallel to the first direction (the "X" direction) whereby a torque of the valve disk 530 may not be 0 as the rotation is stopped at an angle that is smaller than about 90 degrees.

Then, when the current is applied to the solenoid coil 521 in an opposite direction, the torque of the valve disk 530 located at the opening position OP may become gradually higher from a torque that is higher than 0 as the valve disk 530 is rotated to the closing position CP in the second rotational direction.

Meanwhile, unlike the illustration of the drawing, the guide rib 515 may be disposed on the upstream side of the passage 513 whereby the valve disk 530 located at the closing position CP may be disposed in parallel to the third direction (the "Y" direction) when viewed in the direction of the rotary shaft 533.

According to the above-described structure, the flow of the fluid may be stopped and the fluid may be frozen while the valve disk 530 closes the passage 513 at the closing position CP, and even in this case, regardless of that the fluid is unfrozen by using the above-described solenoid coil 521, the valve disk 530 at the closing position CP may be rotated to the opening position OP with a higher torque whereby the fluid frozen in the passage 513 may be effectively broken.

In other words, under the structure that requires a higher torque at the closing position CP as compared with the first embodiment of the present disclosure, the structure of the opening/closing valve 510 that is the other embodiment of the present disclosure may be used.

The above-described structure may open and close the passages 13, 113, 213, 313, 413, and 513 by rotating the valve disks 30, 130, 230, 330, 430, and 530 by using the solenoid coils 21, 421, and 521 without any structure, such as a motor or a gear whereby durability and productivity may be improved. Furthermore, because the valve disks 30, 130, 230, 330, 430, and 530 are rotated by a magnetic force by using the solenoid coils 21, 421, and 521, a sealing performance of the passages 13, 113, 213, 313, 413, and 513 may be improved as compared with a mechanical rotation structure whereby a functional performance of the opening/closing valves 1, 401, and 501 may be improved.

According to the technology, because the valve disk may be rotated by using the solenoid coil, the sealing performance of the opening/closing value may be improved and the durability thereof may be further improved.

Furthermore, according to the technology, because the valve disk may be operated without other components, such as motors and gears, the structure may be simpler and the productivity may be further improved.

Furthermore, the technology may provide a structure, in which the fluid may be unfrozen without a separate heater by using the solenoid coil.

In addition, the present disclosure may provide various effects that are directly or indirectly recognized.

The above description is a simple exemplary description of the technical spirits of the present disclosure, and an ordinary person in the art, to which the present disclosure pertains, may make various corrections and modifications without departing from the essential characteristics of the present disclosure.

Therefore, the embodiments disclosed in the present disclosure are not for limiting the technical spirits of the present disclosure but for describing them, and the scope of the technical spirits of the present disclosure is not limited by the embodiments. The protection scope of the present disclosure should be construed by the following claims, and all the technical spirits in the equivalent range should be construed as being included in the scope of the present disclosure.

What is claimed is:

1. An opening/closing valve comprising:
a valve body defining a passage through which a fluid can flow in a first direction;
a solenoid coil mounted on the valve body along the first direction to surround the passage on an outside of the passage; and
a valve disk including a magnetic substance, the valve disk rotatable within the passage to open and close the passage with the solenoid coil;
wherein the valve disk is rotatable about a rotary shaft extending in a second direction that is perpendicular to the first direction, the valve disk being rotatable between a closing position and an opening position;
wherein the opening/closing valve is configured so that flow of the fluid flowing through the passage is blocked when the valve disk is in the closing position and the flow of the fluid flowing through the passage is allowed when the valve disk is in the opening position;
wherein the valve disk is rotatable in a first rotational direction from the opening position to the closing position;
wherein an inner peripheral surface of the valve body defines the passage; and
wherein the valve body comprises a guide rib protruding from the inner peripheral surface of the valve body to prevent the valve disk from being rotated from the closing position in the first rotational direction.

2. The opening/closing valve of claim 1, wherein:
first and second parts of the valve disk are divided by the rotary shaft;
the first part is movable to an upstream side of the passage when the valve disk is rotated from the closing position to the opening position;
the second part is movable to a downstream side of the passage; and
the guide rib protrudes from the inner peripheral surface of the valve body to support a surface of the first part.

3. The opening/closing valve of claim 1, wherein:
first and second parts of the valve disk are divided by the rotary shaft;
the first part is movable to an upstream side of the passage when the valve disk is rotated from the closing position to the opening position;
the second part is movable to a downstream side of the passage; and
the guide rib protrudes from the inner peripheral surface of the valve body to support a surface of the second part.

4. The opening/closing valve of claim 1, wherein, when viewed in the first direction, the guide rib is disposed in a third direction that is perpendicular to the second direction from a rotational axis of the rotary shaft.

5. The opening/closing valve of claim 1, wherein, when viewed in the second direction, the valve disk defines the closing position as a state in which the valve disk is rotated by a specific angle in the first rotational direction relative to a rotation axis of the rotary shaft from the opening position to the closing position.

6. The opening/closing valve of claim 1, wherein the solenoid coil is configured to apply currents of opposite directions when the valve disk is moved from the closing position to the opening position and the valve disk is moved from the opening position to the closing position.

7. The opening/closing valve of claim 1, further comprising a torsion spring configured to provide an elastic force to cause the valve disk to be rotated from the opening position to the closing position or to cause the valve disk to be rotated from the closing position to the opening position.

8. The opening/closing valve of claim 1, wherein the valve disk is rotatable in a second rotational direction from the closing position to the opening position.

9. The opening/closing valve of claim 1, further comprising a torsion spring configured to provide an elastic force to cause the valve disk to be rotated from the opening position to the closing position.

10. The opening/closing valve of claim 1, further comprising a torsion spring configured to provide an elastic force to cause the valve disk to be rotated from the closing position to the opening position.

11. The opening/closing valve of claim 1, wherein:
the valve disk is rotatable in a second rotational direction from the closing position to the opening position; and
the valve body comprises a stopper configured to protrude from the inner peripheral surface of the valve body to prevent the valve disk from being rotated in the second rotational direction at the opening position.

12. The opening/closing valve of claim 11, wherein, when viewed in the first direction, the stopper is spaced apart from a rotational axis of the rotary shaft in a third direction that is perpendicular to the second direction.

13. An opening/closing valve comprising:
a valve body defining a passage through which a fluid can flow in a first direction, wherein an inner peripheral surface of the valve body defines the passage;
a valve disk including a magnetic substance disposed at a location within the passage, the valve disk rotatable about a rotary shaft between a closing position and an opening position, wherein the rotary shaft extends in a second direction that is perpendicular to the first direction and wherein the opening/closing valve is configured so that flow of the fluid flowing through the passage is blocked when the valve disk is in the closing position and the flow of the fluid flowing through the passage is allowed when the valve disk is in the opening position;
a solenoid coil mounted outside the passage to surround the location within the passage in which the valve disk is disposed; and
a seat member configured to seat the valve disk between the inner peripheral surface of the valve body that defines the passage and the valve disk at the closing position;
wherein the valve body comprises a stopper configured to protrude from the inner peripheral surface of the valve body to prevent the valve disk from being rotated in a first rotational direction in which the valve disk is rotated from the closing position to the opening position at the opening position;
wherein the seat member comprises a seat surface configured to be inclined toward an inside of the passage with respect to the first direction, when viewed in the second direction, to prevent the valve disk at the closing position from being rotated in the first rotational direction, in which the valve disk is rotated from the opening position to the closing position; and
wherein the valve disk includes a contact surface formed to correspond to the seat surface to contact the seat surface at the closing position.

14. The opening/closing valve of claim 13, wherein:
a first surface of the valve disk that faces a downstream side of the passage at the closing position includes a magnetic substance of a first pole; and
a second surface of the valve disk that faces an upstream side of the passage at the closing position includes a magnetic substance of a second pole that is opposite to the first pole.

15. The opening/closing valve of claim 14, wherein, when viewed in the second direction, the rotary shaft is spaced apart from an imaginary reference line extending in a direction that is perpendicular to the first direction and provided at the same distance from the first surface of the valve disk and the second surface of the valve disk, in the first direction or a direction opposite to the first direction.

16. An opening/closing valve comprising:
a valve body defining a passage through which a fluid can flow in a first direction;
a solenoid coil mounted on the valve body along the first direction to surround the passage on an outside of the passage; and
a valve disk located within the passage;
wherein the valve disk is rotatable about a rotary shaft extending in a second direction that is perpendicular to the first direction;
wherein the valve disk is rotatable between a closing position and an opening position;
wherein the opening/closing valve is configured so that flow of the fluid flowing through the passage is blocked when the valve disk is in the closing position and the flow of the fluid flowing through the passage is allowed when the valve disk is in the opening position;
wherein the valve disk comprises a first part and a second part that are divided by the rotary shaft;
wherein the first part is movable to a downstream side of the passage when the valve disk is rotated from the closing position to the opening position;
wherein the second part is movable to an upstream side of the passage; and
wherein the first part includes a magnetic substance of a first pole and the second part includes a magnetic substance of a second pole that is an opposite pole to the first pole.

17. The opening/closing valve of claim 16, wherein:
an inner peripheral surface of the valve body defines the passage;
a second rotational direction is defined as a direction in which the valve disk is rotated from the closing position to the opening position; and
the valve body comprises a stopper protruding from the inner peripheral surface of the valve body to prevent the valve disk from being rotated in the second rotational direction from the opening position.

18. The opening/closing valve of claim 17, wherein, when viewed in the first direction, the stopper is disposed on an imaginary reference line passing through the rotary shaft in the second direction.

* * * * *